(12) United States Patent
Higuchi

(10) Patent No.: US 6,827,460 B2
(45) Date of Patent: Dec. 7, 2004

(54) LIGHTING PANEL HAVING LIGHT-COLLECTING FUNCTION AND DISPLAY DEVICE USING SAME

(75) Inventor: Masaru Higuchi, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/207,163

(22) Filed: Jul. 29, 2002

(65) Prior Publication Data

US 2003/0026108 A1 Feb. 6, 2003

(30) Foreign Application Priority Data

Aug. 3, 2001 (JP) ........................................ 2001-235820

(51) Int. Cl.[7] .............................................. G01D 11/28
(52) U.S. Cl. ........................................ 362/31; 362/561
(58) Field of Search ............................ 362/26, 31, 327, 362/328, 330, 338; 349/63, 65

(56) References Cited

U.S. PATENT DOCUMENTS

| 5,126,882 A | 6/1992 | Oe et al. |
| 5,420,761 A | * 5/1995 | DuNah et al. ............... 362/330 |
| 5,584,556 A | * 12/1996 | Yokoyama et al. ........... 362/26 |
| 5,590,945 A | * 1/1997 | Simms ......................... 362/31 |
| 5,608,837 A | 3/1997 | Tai et al. |
| 6,224,223 B1 | 5/2001 | Higuchi et al. |

FOREIGN PATENT DOCUMENTS

KR       10-0301666 B1     9/2001

* cited by examiner

Primary Examiner—Y My Quach Lee
(74) Attorney, Agent, or Firm—Frishauf, Holtz, Goodman & Chick, P.C.

(57) ABSTRACT

A light-guiding plate has an incidence surface, an end surface formed on the side opposed to the incidence surface, and an optical surface having a surface opposed to the emission surface. The optical surface is constituted by a large number of continuous optical elements, each optical element having a curved surface which refracts part of light introduced from the incidence surface toward the end surface at a low angle along a plane parallel to the emission surface, and an inclined surface which refracts part of light refracted by the curved surface toward the emission surface.

32 Claims, 20 Drawing Sheets

LIGHTING PANEL HAVING LIGHT-COLLECTING FUNCTION AND DISPLAY DEVICE USING SAME

CROSS-REFERENCE TO RELATED APPLICATIONS

This application is based upon and claims the benefit of priority from the prior Japanese Patent Application No. 2001-235820, filed Aug. 3, 2001, the entire contents of which are incorporated herein by reference.

BACKGROUND OF THE INVENTION

1. Field of the Invention

The present invention relates to a lighting panel and a display device in which the lighting panel is used and, particularly, to a lighting panel having a light-collecting function of collecting and emitting incident light rays introduced from a light source or the outside.

2. Description of the Related Art

In a liquid crystal display device, for example, a liquid crystal display panel does not have a self-emission capacity and, therefore, a lighting panel is disposed as a back light on the rear surface side of the liquid crystal display panel. FIG. 24 is a side view of part of an example of such a conventional liquid crystal display device. The liquid crystal display device comprises a liquid display panel 1 and a lighting panel 11 which is disposed on the rear side opposite to the front surface side of the panel which is the observation side.

The liquid crystal panel 1 is configured in such a manner that a glass substrate 2 on the front surface side and a glass substrate 3 on the rear surface side are bonded together through a sealing member (not shown) in the form of a substantially square frame, and that a liquid crystal (not shown) is sealed in a space enclosed by the two glass substrates 2, 3 and the sealing member. A polarizer 4 on the front surface side is bonded to the front surface of the glass substrate 2 on the front surface side and a polarizer 5 on the rear surface side is bonded to the rear surface of the glass substrate 3 on the rear surface side.

The lighting panel 11 includes a light guide plate 12 provided on the rear surface side of the liquid crystal panel 1. The light guide plate 12 has a flat square shape. The surface of the light guide plate 12 opposed to the liquid crystal panel 1 serves as an emission surface 13 from which light is emitted, and a prescribed end surface (the left-hand end surface in FIG. 24) of the light guide plate 12 serves as an incidence surface onto which light is incident. The light guide plate 12 is configured in such a manner that an inclined surface 15 is formed so that the thickness of the light guide plate 12 becomes gradually small, along the rear surface on the rear side with respect to the emission surface 13, from the side of the incidence surface 14 to the side of an end surface 12a opposed to the incidence surface 14.

A reflector 16 is attached to the inclined surface 15 of the light guide plate 12. A cold cathode fluorescent tube (a light source) 17 is provided in a position facing the incidence surface 14 of the light guide plate 12. An end portion of the reflecting sheet 18 which covers the cold cathode fluorescent tube 17 is attached to the front surface on the incidence surface side 14 of the light guide plate 12, and the other end portion is bonded to the rear surface on the incidence surface side 14 of the reflector 16.

Light coming from the cold cathode fluorescent tube 17 and light reflected by the reflecting sheet 18 are caused to be incident onto the incidence surface 14 of the light guide plate 12. The incident light propagates (is guided) through the light guide plate 12 from the incidence surface 14 toward the end surface 12a, is reflected by the reflector 16, emitted from the emission surface 13 and caused to be incident onto the rear surface of the liquid crystal display panel 1, and is caused to irradiate the liquid display panel 1 from the rear surface side thereof. Then, image light corresponding to the display drive of the liquid display panel 1 is emitted from the front surface of the liquid display panel 1.

In the above conventional liquid crystal display device, it is possible to uniformize the luminance distribution of light emitted from the front surface of the liquid crystal display panel 1 by uniformizing an amount of light emitted from the emission surface 13 of the light guide plate 12. Next, this principle will be described below. On the inclined surface 15 of the light guide plate 12 are provided a large number of spot-like light control patterns in black ink in such a manner that the density of spot-like black patterns decreases gradually as they become away from the incidence surface 14, in other words, the absorptance of incident light decreases in proportion to the distance from the incidence surface 14.

More specifically, because near the cold cathode fluorescent tube 17, the intensity of the light which is reflected by the reflector 16 of the light guide plate 12 and emitted from the emission surface 13 toward the liquid crystal display panel 1 is high, the black pattern density formed on the inclined surface 15 of the light guide plate 12 is increased in order to increase the absorptance of the light reflected by the reflector 16. However, because the intensity of the light reflected by the reflector 16 decreases with increasing distance from the cold cathode fluorescent tube 17, the black pattern density formed on the inclined surface 15 of the light guide plate is gradually reduced so that the absorptance decreases gradually. As a result, the intensity of the light emitted from the emission surface 13 of the light guide plate 12 becomes uniform over the whole surface.

In the above conventional liquid crystal display device, because a large number of spot-like light control patterns in black ink are provided on the inclined surface 15 of the light guide plate 12, part of light is absorbed by the light control patterns. This poses the problem that the utilization efficiency of light is low, resulting in a decrease in luminance.

BRIEF SUMMARY OF THE INVENTION

The object of the invention is to provide a lighting panel capable of improving the utilization efficiency of light and a display device in which the panel is used.

In a first aspect of the invention, an optical surface constituted by a large number of continuous optical elements is provided on a light guide plate. Each optical element has a curved surface, which refracts part of light introduced from the incidence surface toward the end surface at a low angle along a plane parallel to the emission surface, and an inclined surface which refracts part of light refracted by the curved surface toward the emission surface.

In a second aspect of the invention, on a light guide plate which has an incidence surface on which light emitted from a point light source is incident, there is formed an inclined surface which is extended in a direction substantially parallel to the incidence surface.

In a third aspect, an optical sheet is disposed on the side of an emission surface of a light guide plate. The optical sheet causes light emitted from the emission surface of the light guide plate in a direction substantially perpendicular to the emission surface to pass therethrough without any change, and converts light emitted in a slant direction from the emission surface of the light guide plate toward an end surface of the light guide plate into light to be emitted from the front surface of the optical sheet in a direction substantially perpendicular to the emission surface of the light guide plate.

According to the first aspect of the invention, owing to the optical surface formed on the light guide plate, which has the curved surfaces and inclined surfaces, also on a distal end remote from the incidence surface of the light guide plate, light introduced from the incidence surface is sufficiently refracted to the emission surface of the light guide plate. Therefore, the utilization efficiency of light can be improved.

According to the second aspect of the invention, light introduced from the point light source is refracted in a direction parallel to the incidence surface by means of the inclined surface which is extended in a direction substantially parallel to the incidence surface. Therefore, the utilization efficiency of light can be improved.

According to the third aspect of the invention, light emitted in a slant direction from the emission surface of the light guide plate toward the end surface is converted by means of the optical sheet in a direction substantially vertical to the emission surface of the light guide plate. Therefore, the utilization efficiency of light can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiment 1

Figure 1:
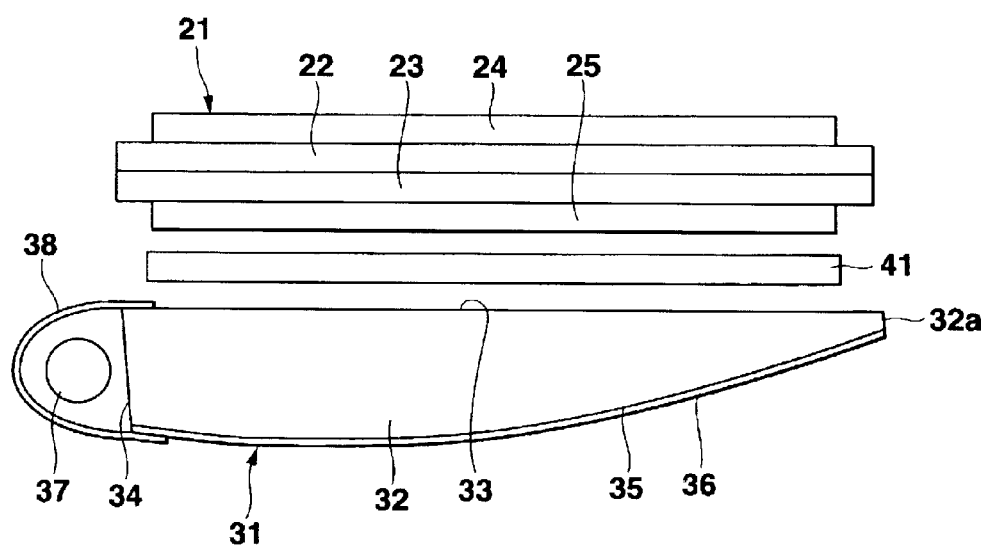
FIG. 1 is a side view of part of a liquid crystal display device related to the first embodiment of the invention.

FIG. 1 is a side view of part of a liquid crystal display device related to a first embodiment of the invention. The liquid crystal display device includes a liquid display panel 21, a lighting panel 31 which is disposed on the rear surface on the side opposite to the front surface of the panel which is the observation side, and a diffuser or diffusing plate 41 disposed between the panels 21, 31.

The liquid crystal panel 21 is configured in such a manner that a glass substrate 22 on the front surface side and a glass substrate 23 on the rear surface side are bonded together through a sealing member (not shown) in the form of a substantially square frame, and that a liquid crystal (not shown) is sealed in a space enclosed by the two glass substrates 22, 23 and the sealing member. A polarizer 24 on the front surface side is bonded to the front surface of the front glass substrate 22 and a polarizer 25 on the rear surface side is bonded to the rear surface of the rear glass substrate 23.

The liquid crystal panel 21 may be any one of an active matrix type, a simple matrix type, a segment type, etc. Also the display method of the liquid crystal panel 21 may be any one of a TN (twisted magnetic) method, an STN (super twisted magnetic) method, an ECB (double refraction effect) method, a dynamic scattering effect method, a method using a ferroelectric liquid crystal, etc. so long as it is a method of controlling a transmittivity of light.

The lighting panel 31 includes a light guide plate or body 32 provided on the rear side of the liquid display panel 21. The light guide plate 32 has a flat square shape. The surface of the light guide plate opposed to the liquid crystal panel 21 serves as an emission surface 33 from which light is emitted, and a prescribed end surface (the left-hand end surface in FIG. 1) of the light guide plate serves as an incidence surface 34 on which light is incident. A surface opposed to the emission surface 33 serves as an optical surface 35. Also, a surface opposed to the incidence surface 34 serves as an end surface 32a. As shown in FIG. 1, the optical surface 35 is such that, as a whole, the rear surface on the rear side with respect to the emission surface 33 is curved in such a manner that the thickness of the light guide plate 32 decreases gradually after it increases gradually from the side of the incidence surface 34 toward the end surface 32a. As a result, the optical surface 35 obtains what is called a ship bottom type profile. This shape of the optical surface is the greatest feature of the invention and will be described in detail later.

A reflecting layer 36 is formed on the optical surface 35 of the light guide plate 32. A cold cathode fluorescent tube 37 which is a light source is provided in a position facing the incidence surface 34 of the light guide plate 32. An end portion of a reflecting sheet 38 which covers the cold cathode fluorescent tube 37, is bonded to the front surface on the side of the incidence surface 34 of the light guide plate 32, and the other end portion is bonded to the rear surface on the side of the incidence surface 34 of the reflector 36.

Next, the optical surface 35 of the light guide plate 32 will be described by referring to FIG. 2. The optical surface 35 is constituted by a large number of continuous sets of optical elements, each set being continuously provided with from the side of the incidence surface 34 (left-hand side in FIG. 2) toward the side of the end surface 32a, a curved surface 35a, a flat surface 35b and an inclined surface 35c in this order. The flat surface 35b is substantially parallel to the emission surface 33.

The length of a set of optical elements i.e. the curved surface 35a, flat surface 35b and inclined surface 35c is 20 to 500 μm or so. The transmission efficiency is improved by gradually increasing the length of a set of optical elements with increasing distance from the incident surface 34. However, a reasonable effect can be obtained even when this length is set at a constant size.

The inclination angle of all inclined surfaces 35c relative to the flat surface 35b parallel to the emission surface 33 is the same and is set at an appropriate angle in the range of 40 to 50° or so. The height H of the inclined surface 35c relative to the flat surface 35b increases gradually with increasing distance from the incidence surface 34. The height H of the inclined surface 35c, which is typically about 20 to 50 μm maximum, is set at an appropriate value according to the flat surface size of the light guide plate 32, but not limited to the above values.

The length of all curved surfaces 35a is substantially the same. The length of the flat surface 35b decreases gradually with increasing distance from the incidence surface 34. That is, the height H of the inclined surface 35c increases in proportion to the distance from the incidence surface 34, and the length of the flat surface 35b decreases in proportion to the distance from the incidence surface 34. For this reason, an amount of light which is reflected (refracted) by the inclined surfaces 35c and directed toward the emission surface 33 increases exponentially in proportion to the distance from the incidence surface 34.

Figure 2:
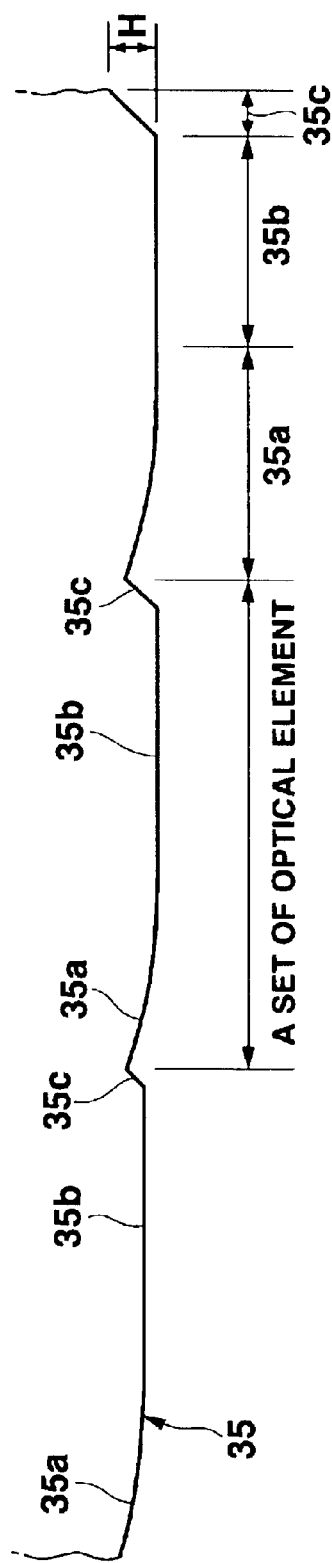
FIG. 2 is an explanatory diagram of an optical plane of a light guide plate shown in FIG. 1.

Each optical element is arranged from the side of the incidence surface 34 of the light guide plate 32 in the order: the curved surface 35a, flat surface 35b and inclined surface 35c, and the curved surface 35a is continuously provided adjacent to the inclined surface 35c, which is an adjoining optical element on the side of the incidence surface 34 (left-hand side in FIG. 2). Typically, the curved surface 35a has a cross-section in the shape of a circular arc, though not in a limiting sense, and the radius of curvature of the curved surface 35a is, for example, 0.1 to 2.0 mm. Thus, the curved surface 35a slants to the right.

By way of example, the height H of an n-th inclined surface 35c counted from the side of the incidence surface 34, relative to the flat surface 35b is a n (n+1)/2 (where, a is an arbitrary number and n is a natural number, which is 1 for the first inclined surface 35c on the side of the incidence surface 34). By thus gradually increasing the height H of the inclined surface 35c relative to the flat surface 35b with increasing distance from the incidence surface 34, it is possible to uniformize the brightness at the emission surface 33. Furthermore, as described above, as shown in FIG. 1, the optical surface 35 is curved in such a manner that the thickness of the light guide plate 32 decreases gradually after it increases gradually basically from the side of the incidence surface 34 toward the side of the end surface 32a, with the result that the optical surface 35 obtains what is called a ship bottom type profile. This shape of the optical surface is obtained in order to further improve the uniformity of the brightness at the emission surface 33.

In FIG. 1, usually it is necessary only that the angle of the incidence surface 34 with the emission surface 33 be 90°. However, this angle may be made a little smaller than 90° in order to further improve the light capture efficiency. That is, when it is ensured that light which is caused to be incident from the incidence surface 34 on the light guide plate 32 propagates rectilinearly and is directly reflected (refracted) by the inclined surface 35c of the optical surface on the side opposite to the incidence surface 34, only that area becomes bright and the other area becomes dark. Therefore, the light capture efficiency is improved by setting the incidence surface 34 at a slight angle with the emission surface 33 in order to ensure that the incident light propagates while repeating reflection on the emission surface 33 and the curved surface 35a and flat surface 35b of optical surface 35. Usually, this angle is not less than 80° but less than 90°. However, conversely this angle may be not more than 100° but more than 90°. The point is that it is necessary only to reduce the probability that light which is caused to be incident from the cold cathode fluorescent tube 37 on the light guide plate 32 is directly reflected by the inclined surface 35c of the light guide plate 32.

The light guide plate 32 having a construction as described above can be manufactured by injection compression molding from transparent resins of good light transmission properties, such as acrylic resins. The reflecting layer 36 shown in FIG. 1 may be obtained by bonding metal foil of Al, Ag, Cr, etc. on the optical surface 35 of the light guide plate 32 in such a manner that the metal foil is bent to adapt to the profile of the optical surface 35. Alternately, the reflecting layer 36 may be formed by a metal film of Al, Ag, Cr, etc. formed on the optical surface 35 of the light guide plate 32 by sputtering, vapor deposition, etc. It is preferable that the end surface 32a of the light guide plate 32 be as thin as possible in order to prevent light leakage therefrom, and a reflecting layer may be formed on the external surface as required.

Because the liquid crystal display device of this embodiment is a transmission/reflection type, first the operation of the light guide plate 32 when the liquid crystal display device is used as a transmission type will be described by referring to FIG. 3. Incidentally, in FIG. 3 the thickness of the light guide plate 32 is an appropriate value and the reflecting layer 36 shown in FIG. 1 is omitted.

Figure 3:
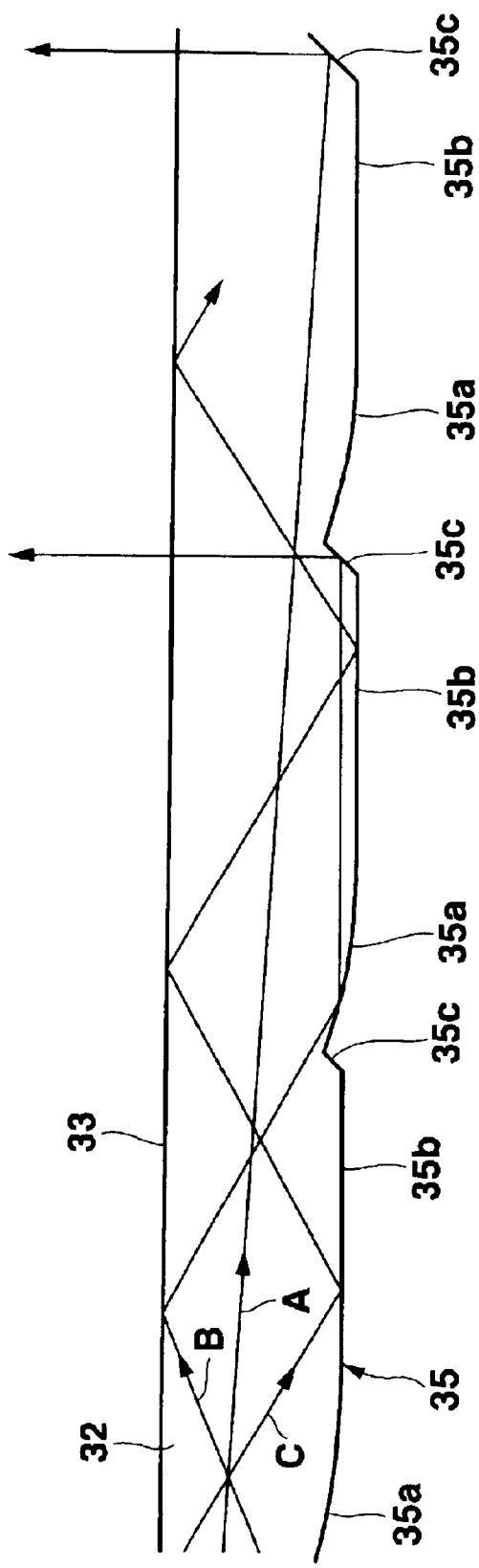
FIG. 3 is an explanatory diagram of a refraction action of the light incident on an incidence surface of the light guide plate having an optical surface shown in FIG. 2.

When the liquid crystal display device of this embodiment is used as a transmission type, light caused to be incident on the incidence surface 34 shown in FIG. 1 propagates within the light guide plate 32 as representative rays of light indicated by the arrows A, B and C in FIG. 3. Light indicated by the arrow A is reflected by the inclined surface 35c, with its angle changed to a direction substantially perpendicular to the emission surface 33, and this light is then emitted from the emission surface 33 in a direction substantially perpendicular to the emission surface 33.

Light indicated by the arrow B is reflected by the emission surface 33 and caused to be incident on the curved surface 35a. In this case, because the curved surface 35a is not parallel to the emission surface 33 and slants to the right in FIG. 3, light caused to be incident on the curved surface 35a is reflected at an angle smaller than the direction of incidence and propagates while approaching a direction substantially parallel to the flat surface 35b of the same set of optical elements. For this reason, the light indicated by the arrow B is caused to be incident on the inclined surface 35c of the same set of optical elements as the curved surface 35a that reflected this light.

Thus, the reason why the curved surface 35a slanting to a direction opposite to the incidence surface 34 is provided in each set of optical elements, is that by causing the propagation direction of the light of the arrow B reflected by the curved surface 35a to approach a direction parallel to the flat surface 35b of the same set of optical elements, it is ensured that this light indicated by the arrow B is caused to be positively incident on the inclined surface 35c of the same set of optical elements. The light caused to be incident on the inclined surface 35c is reflected by this inclined surface 35c, with its angle changed to a direction substantially perpendicular to the emission surface 33, and this light is then emitted from the emission surface 33 in a direction substantially perpendicular thereto.

Light indicated by the arrow C repeats reflection on the flat surfaces 35b and reflection on the emission surface 33, and propagates within the light guide plate 32 from the side of the incidence surface 34 to the side of the end surface 32a, i.e., to the right in FIG. 3. The propagating light is eventually reflected by the inclined surface 35c and then emitted from the emission surface 33 in a direction substantially perpendicular thereto in the same manner as the light indicated by the arrow A. Alternately, in the same manner as the light indicated by the arrow B, after being reflected by the curved surface 35a, this propagating light is reflected by the inclined surface 35c of the same set of optical elements and emitted from the emission surface 33 in a direction substantially perpendicular thereto.

In this manner, the rays of light indicated by the arrows A, B and C are eventually reflected by any one of the inclined surfaces 35c and emitted from the emission surface 33 in a direction substantially perpendicular thereto. In this case, the height H of the inclined surface 35c of each group of optical elements relative to the flat surface 35b increases gradually from the side of the incidence surface 34 shown in FIG. 1 to the side of the end surface 32a. Therefore, the area of the inclined surface 35c increases gradually from the side of the incidence surface 34 shown in FIG. 1 to the side of the end surface 32a. As a result, even when the amount of light decreases with increasing distance from the incidence surface 34, the area of the inclined surface 35c and, therefore, the amount of light emitted from the emission surface 33 is made uniform.

Next, the operation of the lighting panel 31 when the liquid crystal display device shown in FIG. 1 is used as a reflection type will be described below.

Figure 4:
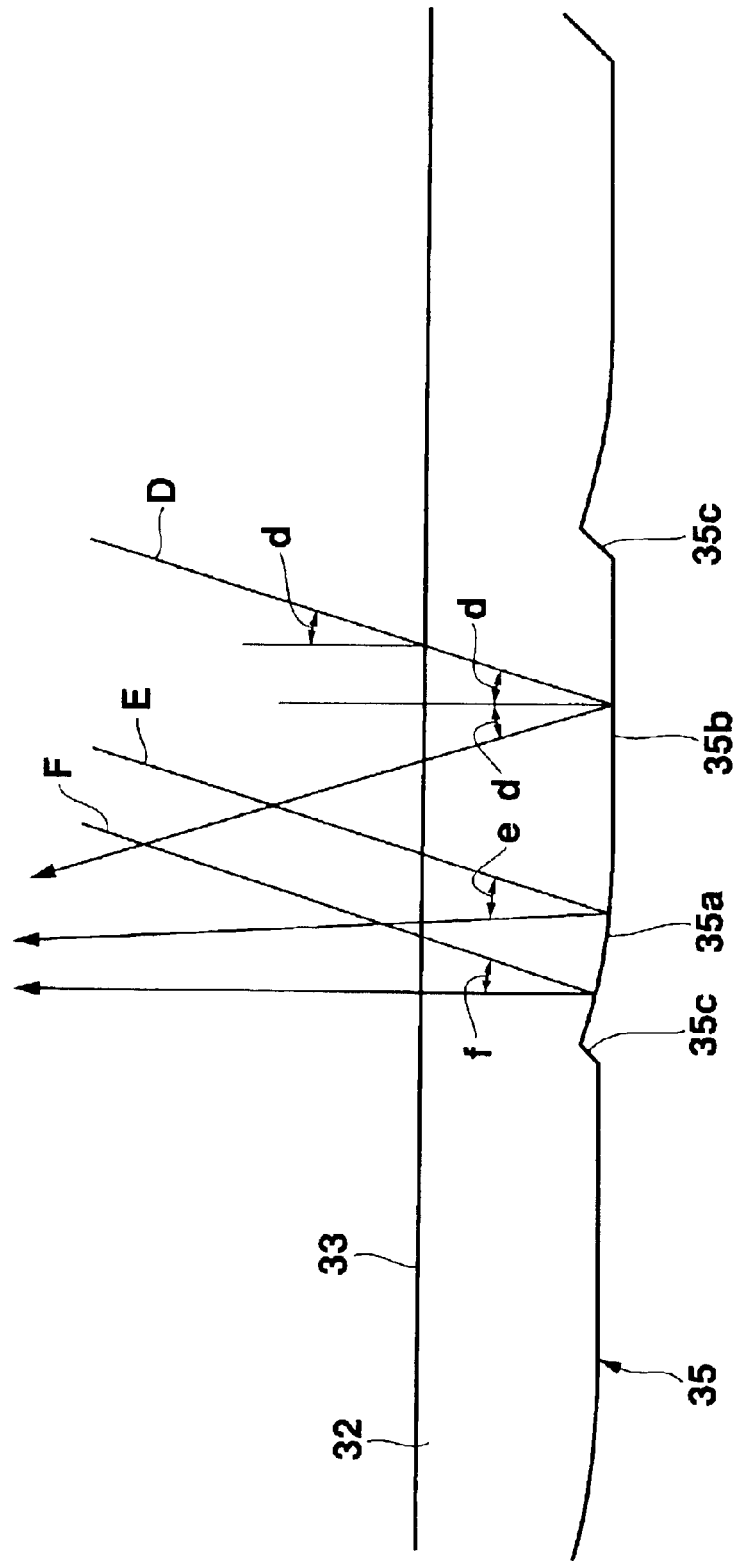
FIG. 4 is an explanatory diagram of a reflex action on the incidence surface of the light guide plate having the optical surface shown in FIG. 2.

External light is caused to be incident on the emission surface 33 as representative rays of light indicated by the arrows D, E, and F in FIG. 4. In this case, reflection on the emission surface 33 is neglected. Furthermore, the external light rays indicated by the arrows D, E and F provide rays of light which are parallel to each other. In FIG. 4, these rays are caused to be incident on the emission surface 33 at an incident angle d from up right to down left.

The external light indicated by the arrow D is reflected by the flat surface 35b and emitted from the emission surface 33. (In actuality, this external light is reflected by a portion of the reflecting layer 36 corresponding to this position. However, for the simplification of the description, the position in the light guide plate 32 is used to provide the explanation. The same applies to other positions.) In this case, the reflection on the flat surface 35b is regular reflection. Therefore, the external light indicated by the arrow D is caused to be incident on the flat surface 35b and reflected at a reflection angle d. Therefore, the angle of the incident light with the reflected light (hereinafter referred to as a deviation angle) is 2d.

The external light indicated by the arrow E is reflected by the curved surface 35a on the right side in FIG. 4 as compared with the external light F and emitted through the emission surface 33. In this case, the curved surface 35a slants to the right in FIG. 4 and, therefore, the deviation angle e on the curved surface 35a is smaller than the above deviation angle 2d on the flat surface 35b.

The external light indicated by the arrow F is reflected by the curved surface 35a on the left side in FIG. 4 as compared with the external light E and emitted from the emission surface 33. Also in this case, the curved surface 35a slants to the right in FIG. 4. However, the angle of a tangential line at each point of the curved surface 35a with the flat surface 35b increases gradually toward the left in FIG. 4 and, therefore, the deviation angle f on the left side of the curved surface 35a becomes smaller than the deviation angle e on the right side.

Thus, the rays of external light indicated by the arrows D, E and F, which are caused to be incident on the emission surface 33 parallel to each other from up right to down left in FIG. 4, are either regularly reflected or reflected at a smaller reflection angle than a reflection angle in the case of this regular reflection, and emitted from the emission surface 33. In this case, because the deviation angles on the curved surfaces 35a decrease gradually toward the left in FIG. 4, the angles (incident angles) of the external light reflected by the curved surfaces 35a and emitted from the emission surface 33 with a normal line of the emission surface 3 decrease gradually from right to left in FIG. 4.

Therefore, even when the rays of external light indicated by the arrows D, E and F which are caused to be incident on the emission surface 33 are parallel to each other, the rays of external light indicated by the arrows D, E and F which are emitted from the emission surface 33 are collected somewhat left in FIG. 4 with respect to a direction perpendicular to the emission surface 33.

Next, a case where the liquid crystal display device shown in FIG. 1 is used as a transmission type will be described below. When the cold cathode fluorescent tube 37 is lighted, light coming from the cold cathode fluorescent tube 37 and light reflected by the reflecting sheet 38 are caused to be incident onto the incidence surface 34 of the light guide plate 32. This incident light propagates within the light guide plate 32 as representative rays of light indicated by the arrows A, B and C in FIG. 3. The rays of light indicated by the arrows A, B and C are eventually reflected by any one of the inclined surfaces 35c and emitted from the emission surface 33 in a direction substantially perpendicular thereto. Therefore, almost all the light caused to be incident on the incidence surface 34 is eventually reflected by any one of the inclined surfaces 35c and emitted from the emission surface 33 in a direction substantially perpendicular thereto.

Besides, in this case, as shown in FIG. 2, the height H of the inclined surface 35c relative to the flat surface 35b of the same group of optical elements increases gradually from the side of the incidence surface 34 to the side of the end surface 32a. Therefore, the areas of the inclined surfaces 35c increase gradually from the side of the incidence surface 34 shown in FIG. 1 to the side of the end surface 32a.

As a result of this, even when the amount of light decreases with increasing distance from the cold cathode fluorescent tube 37, the areas of the inclined surfaces 35c increase, and, therefore, the amount of light emitted from the emission surface 33 is made uniform. Besides, in this case, almost all the light caused to be incident on the incidence surface 34 is reflected by any one of the inclined surfaces 35c and emitted from the emission surface 33 in a direction substantially perpendicular thereto. Therefore, luminance can be increased by improving the utilization efficiency of light.

Light emitted from the emission surface 33 of the light guide plate 32 in a direction substantially perpendicular thereto is diffused while passing through the diffuser 41, caused to be incident on the rear surface of the liquid crystal display panel 21, and caused to irradiate the liquid crystal display panel 21 from the rear face side thereof. Then, image light corresponding to the display drive of the liquid crystal display panel 21 is emitted from the front surface of the liquid crystal display panel 21.

As described above, when the liquid crystal display device shown in FIG. 1 is used as a transmission type, luminance can be improved by increasing the utilization efficiency of light by the lighting panel 31 and besides luminance can be made uniform. Therefore, display quality can be improved.

On the other hand, when this liquid crystal display device is used as a reflection type, external light is used without lighting the cold cathode fluorescent tube 37. That is, external light caused to be incident on the front surface of the liquid crystal display panel 21 from the front surface side thereof passes through the liquid crystal display panel 21, is diffused while passing through the diffuser 41, caused to be incident on the emission surface 33 of the light guide plate 32, and reflected by the reflector 36.

Contrary to the foregoing, this incident light is emitted from the emission surface 33 of the light guide plate 32, diffused while passing through the diffuser 41, caused to be incident on the rear surface of the liquid crystal display panel 21, and caused to irradiate the liquid crystal display panel 21 from the rear surface side thereof. Then, image light corresponding to the display drive of the liquid crystal display panel 21 is emitted from the front surface of the liquid crystal display panel 21.

Now a case where this liquid crystal display device is actually used as a reflection type will be described below. In an actual condition of use, when the top end side of the screen of the liquid crystal display panel 21 is the right end side of FIG. 1, it is often general practice to tilt the liquid crystal display panel 21 in order to capture mainly the external light coming from up right to down left of FIG. 1 and to look at the screen from a front direction of the screen of the liquid crystal display panel 21, i.e., a direction perpendicular to the screen or a direction somewhat down (left in FIG. 1) from this perpendicular direction.

Therefore, when the liquid crystal display panel 21 is tilted so that external light coming from up right to down left in FIG. 1 is mainly captured, the external light which has passed through the liquid crystal display panel 21 and diffuser 41 without any change, and the external light is then caused to be incident on the emission surface 33 of the light guide plate 32 as representative rays indicated by the arrows D, E and F in FIG. 4. Also in this case, the reflection on the emission surface 33 is ignored. Also, the rays of external light indicated by the arrows D, E and F are parallel to each other.

The rays of external light indicated by the arrows D, E and F, which have been caused to be incident on the emission surface 33, are described above either regularly reflected or reflected at a smaller reflection angle than a reflection angle in the case of this regular reflection, and emitted from the emission surface 33. In this case, because the reflection angles on the curved surfaces 35a decrease gradually toward the left in FIG. 4, the angles of the external light reflected by the curved surfaces 35a and emitted from the emission surface 33 with a normal line of the emission surface 33 decreases gradually from right to left in FIG. 4.

Therefore, even when the rays of external light indicated by the arrows D, E and F which are caused to be incident on the emission surface 33 are parallel to each other, the rays of external light indicated by the arrows D, E and F which are emitted from the emission surface 33 are collected somewhat left in FIG. 4 with respect to a direction perpendicular thereto. When these rays of external light pass through the diffuser 41 and the liquid crystal display panel 21 without any change, image light is collected in the direction of the front surface of the liquid display panel 21, i.e., somewhat down (left in FIG. 1) from a direction perpendicular to the screen and emitted.

As described above, when this liquid crystal display device is actually used as a reflection type, on the basis of external light coming from up right to down left in FIG. 1, it is possible to collect the image light in a direction somewhat down (left in FIG. 1) from the front direction of the screen of the liquid crystal display panel 21, i.e., a direction perpendicular to the screen and to cause the light to be emitted from this direction. The direction of emission of the image light in this case is the visual direction and, therefore, bright images can be obtained.

When used as a transmission type as well as used as a reflection type, the type above-described diffuser 41 serves to improve the in-plane uniformity of transmitted light and reflected light, thereby adjusting the angle of visibility. Also when used as a reflection type, the type above-described diffuser 41 serves to reduce doubling.

When the front surface of the diffuser 41 is formed in concavo-convex shape by use of a filler material etc., the angle of incidence and range of incidence for capturing external light widen in all directions and it is possible to further reduce doubling because of high diffusivity.

Instead of using the diffuser 41, the adhesive to bond the rear surface side polarizer 25 of the liquid crystal display panel 21 to the rear glass substrate 23 may be given the function of diffusion by mixing a filler having a different refractive index in the adhesive. Furthermore, such an adhesive having a function of diffusion and the diffuser 41 may be used in combination.

Figure 5:
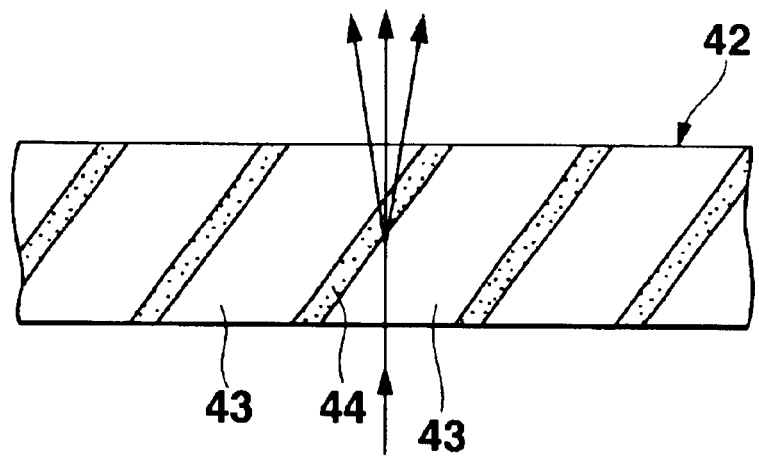
FIG. 5 is an explanatory diagram of a transmission action of light when vertical light is incident on a transmitter/diffuser as a substitute for a diffuser shown in FIG. 1.

In place of the general diffuser 41, a transmitter/diffuser 42 as shown in FIG. 5 may be used. This transmitter/diffuser 42 is constituted by a plurality of transmission layers 43 of colorless resin etc. and a plurality of diffusion layers 44 of transparent resin etc., which are alternately arranged. In this case, although the thickness of the transmitter/diffuser 42 is constant, both the transmission layer 43 and the diffusion layer 44 are appropriately slanted in the same direction with respect to the plate face of the transmitter/diffuser 42 (in this case, from up right to down left in FIG. 5). In FIG. 5, the upper right portion of the diffusion layer 44 and the lower left portion of the adjacent diffusion layer 44 on the right side are aligned with each other or overlap in the horizontal direction.

When this diffuser is used as a transmission type as shown in FIG. 3, light which has been emitted from the emission surface 33 of the light guide plate 32 in a direction substantially perpendicular thereto is diffused by the diffusion layer 44 of the transmitter/diffuser 42 and emitted from the front surface of the transmitter/diffuser 42, as indicated by arrows in FIG. 5 (however, the deflection on the surfaces of the transmitter/diffuser 42 is ignored). In this case, in FIG. 5 the upper right portion of the diffusion layer 44 and the lower left portion of adjacent diffusion layer 44 on the right side are aligned with each other or overlap in the horizontal direction and, therefore, all the light emitted from the emission surface 33 of the light guide plate 32 in a direction substantially perpendicular thereto is positively diffused by any one of the diffusion layers 44 of the transmitter/diffuser 42.

Figure 6:
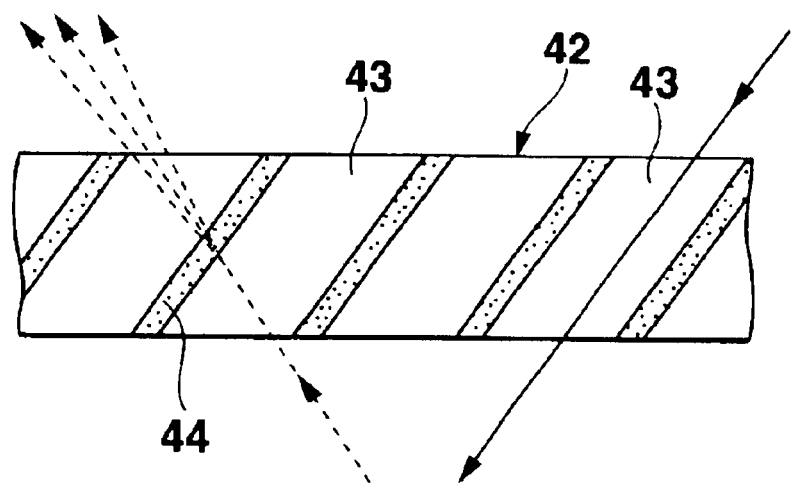
FIG. 6 is an explanatory diagram of the transmission action of light when slant light is incident on the transmitter/diffuser as a substitute for the diffuser shown in FIG. 1.

When the diffuser is used as a reflection type, as indicated by a solid arrow in FIG. 6, external light which has propagated from up right to down left passes through the transmission layer 43 of the transmitter/diffuser 42 (however, the reflection on the front and rear surfaces of the transmitter/diffuser 42 is ignored).

This transmitted light is reflected by the optical surface 35 of the light guide plate 32 as indicated by the arrows in FIG. 4. This transmitted light is diffused by the diffusion layer 44 of the transmitter/diffuser 42 and emitted from the front surface of the transmitter/diffuser 42 as indicated by the arrows of dotted line in FIG. 6 (however, the reflection on the front and rear surfaces of the transmitter/diffuser 42 is ignored). Also in this case, in FIG. 6 the upper right portion of the diffusion layer 44 and the lower left portion of adjacent diffusion layer 44 on the right side are aligned with each other or overlap in the horizontal direction and, therefore, all the light emitted from the emission surface 33 of the light guide plate 32 is positively diffused by any one of the diffusion layers 44 of the transmitter/diffuser 42.

The optical surface 35 of the light guide plate 32 is not limited to that shown in FIG. 2. For example, with reference to FIG. 2, the inclination angles of the inclined surfaces 35c of set of optical elements with respect to the flat surfaces 35b may be gradually increased from the side of the incidence surface 34 to the side of the end surface 32a in the range of 40 to 50° or so.

Also, the length of each set of optical elements constituted by the curved surface 35a, flat surface 35b and inclined surface 35c may not be constant. For example, a set of optical elements constituted by the curved surface 35a, flat surface 35b and inclined surface 35c may not be constant, with the length of the curved surface 35a and the flat surface 35b being constant and the height H of the inclined surface 35c being varied. However, also in this case, the length of a set of optical elements constituted by the curved surface 35a, flat surface 35b and inclined surface 35c is in the range of 20 to 500 μm or so.

Like the rays of light indicated by the arrow A, B and C, light which is reflected by any one of the inclined surfaces 35c and emitted from the emission surface 33 in a direction substantially perpendicular thereto is part of the light caused to be incident on the incidence surface 34 shown in FIG. 1, and not almost all the light caused to be incident on the incidence surface 34. That is, part of the light reflected by the curved surface 35a and flat surface 35b is emitted from the emission surface 33 without any change. For this reason, as indicated by the arrows of alternate long and short dash line in FIG. 7, on an imaginary plane perpendicular to the emission surface 33 and incidence surface 34 of the light guide plate 32, light reflected by the inclined surface 35c is emitted from the emission surface 33 in a direction substantially perpendicular thereto, as indicated by the arrow of solid line. However, part of light reflected by the curved surface 35a and flat surface 35b is emitted, as indicated by the arrows of dotted line, from the emission surface 33 of the light guide plate 32 in a slant direction toward the side on which the light becomes distant from the incidence surface 34 of the light guide plate 32. Therefore, almost all light which has been caused to be incident on the incidence surface 34 can be emitted from the emission surface 33 and hence the utilization efficiency of light can be improved. Also, due to the difference in the areas of the inclined surfaces 35c, the amount of light reflected by the inclined surface 35c and emitted from the emission surface 33 can be made uniform. However, as indicated by the arrows of dotted line in FIG. 7, there exists light which is emitted from the emission surface 33 of the light guide plate 32 toward the side on which the light becomes distant from the incidence surface 34 of the light guide plate 32. If this light is collected, peak luminance on the front surface of the liquid crystal display panel 21 further increases and hence the utilization efficiency of light can be further improved.

Next, there will be shown an embodiment that permits collecting of light emitted from the emission surface 33 of the light guide plate 32 in a slant direction toward the side on which the light becomes distant from the incidence surface 34 of the light guide plate 32.

Embodiment 2

Figure 8:
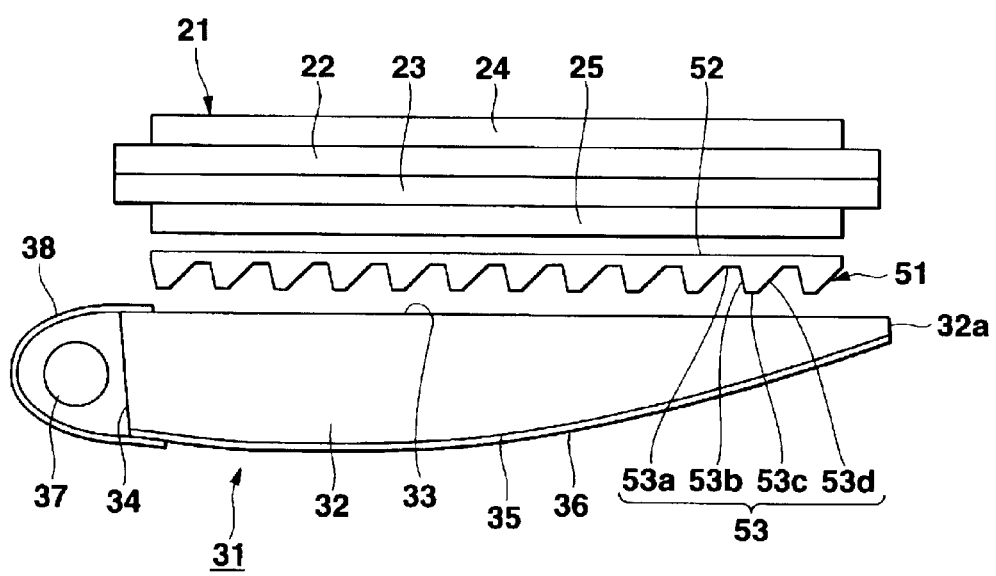
FIG. 8 is a side view of part of a liquid crystal display device related to the second embodiment of the invention.

FIG. 8 is a side view of part of a liquid crystal display device related to a second embodiment of the invention. As with the first embodiment, this liquid crystal display device also includes a liquid display panel 21 and a lighting panel 31 which is disposed on the rear surface on the side opposite to the front surface of the panel which is the observation side. However, between the liquid crystal display panel 21 and the lighting panel 31 is disposed an optical sheet 51 in place of the diffuser 41 in the first embodiment. The feature of the embodiment resides in the function of this optical sheet 51 and this feature will be mainly described below. Incidentally, in the following descriptions, the same component elements as in the first embodiment will be given the same reference numerals and their descriptions will be omitted.

The optical sheet 51 has a flat square shape. The front surface opposed to the liquid crystal display panel 21 is a flat surface 52 and the rear surface on the side opposite to the flat surface 52 is an optical surface 53. The optical surface includes two inclined surfaces 53b, 53d, of each of grooves having a roughly trapezoidal shape which are formed at a constant pitch, a flat surface or bottom surface 53a of the upper side, and a flat surface 53c between the two grooves. That is, the optical surface 53 is constituted by a large number of continuous sets of optical elements, each set being continuously provided from the side of the incidence surface 34 toward the side of the end surface 32a, i.e., the flat surface 53a, the inclined surface 53b, the flat surface 53c and the inclined surface 53d in this order. The shape of the optical surface 53 is always the same in a direction perpendicular to the paper surface of FIG. 8. In other words, all the grooves each having a roughly trapezoidal section are extended perpendicularly to both side surfaces of the optical sheet 51 in the width direction thereof and across the whole width thereof.

The flat surfaces 52, 53a, 53c are parallel to the emission surface 33 of the light guide plate 32. The inclination angles of all inclined surfaces 53b against the flat surface 52 (the surface parallel to the emission surface 53 of the light guide plate 32) are almost the same and each may provide a surface substantially perpendicular to the flat surface 52 or an inclined surface similar to this surface. Preferably, the inclination angle of the inclined surface 53d with the flat surface 52 is almost the same and is set at an appropriate angle in the range of 30 to 50°.

The length of a set of optical elements constituted by the flat surface 53a, inclined surface 53b, flat surface 53c and inclined surface 53d is almost the same as the pixel pitch of the liquid crystal display panel 21 or a value obtained by dividing the pixel pitch by an integer. The optical sheet 51 having a construction as described above can be manufactured by injection compression molding from transparent resins of good light transmission properties, such as acrylic resins.

The optical sheet 51 has a function of collecting light emitted in a slant direction from the emission surface 33 of the light guide plate 32 toward the front surface of the liquid crystal display panel 21 and this operation of the optical sheet 51 will be described below by referring to FIG. 9. Light emitted from the emission surface 33 of the light guide plate 32 shown in FIG. 8 passes through the optical sheet 51 as representative rays of light indicated in FIG. 9 by the arrows J, K and L. As indicated by the arrows of solid line in FIG. 7, the rays of light indicated by the arrows J and K are emitted from the emission surface 33 of the light guide plate 32 in a direction substantially perpendicular thereto, are caused to be incident on the flat surfaces 53a, 53c of the optical sheet 51, and pass through the optical sheet 51 without any change, and these rays of light are then emitted from the flat surface 52 of the optical sheet 51 in a direction substantially perpendicular thereto.

Figure 7:
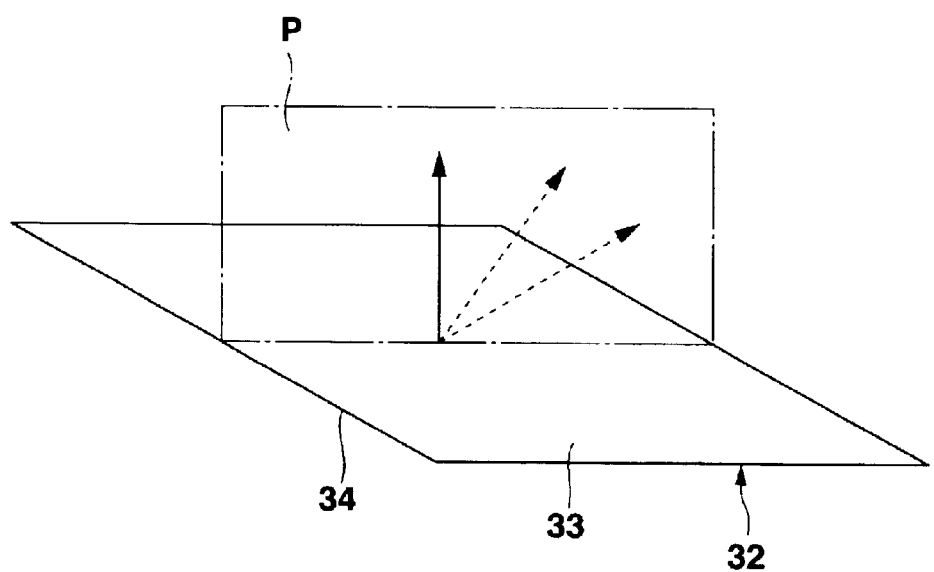
FIG. 7 is an explanatory diagram of light emitted from the emission surface of the light guide plate having the optical surface shown in FIG. 2.

As indicated by the arrows of dotted line in FIG. 7, the ray of light indicated by the arrow L is emitted from the emission surface 33 of the light guide plate 32 in a slant direction from the side of the incidence surface 34 of the light guide plate 32 toward the end surface 32a, is caused to be incident on the inclined surface 53b of the optical sheet 51, is reflected by the inclined surface 53d, with its angle changed to a direction substantially perpendicular to the flat surface 52 of the optical sheet 51, and is emitted from the flat surface 52 of the optical sheet 51 in a direction substantially perpendicular thereto.

In this manner, the rays of light indicated by the arrows J, K, L are emitted from the flat surface 52 of the optical sheet 51 in a direction substantially perpendicular thereto. Therefore, almost all the light caused to be incident on the incidence surface 34 of the light guide plate 32 is eventually emitted from the flat surface 52 of the optical sheet 51 in a direction substantially perpendicular thereto. As a result of this, the peak luminance on the front surface of the liquid crystal display panel 21 can be increased and the utilization factor of light can be sufficiently improved.

Figure 9:
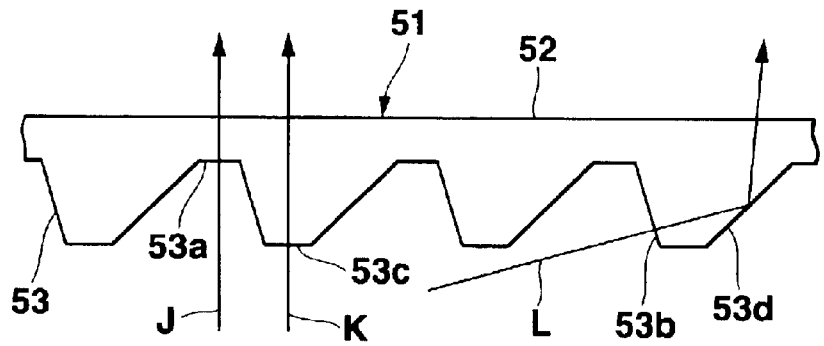
FIG. 9 is an enlarged side view of a first example of modification of an optical sheet shown in FIG. 8.
Figure 10:
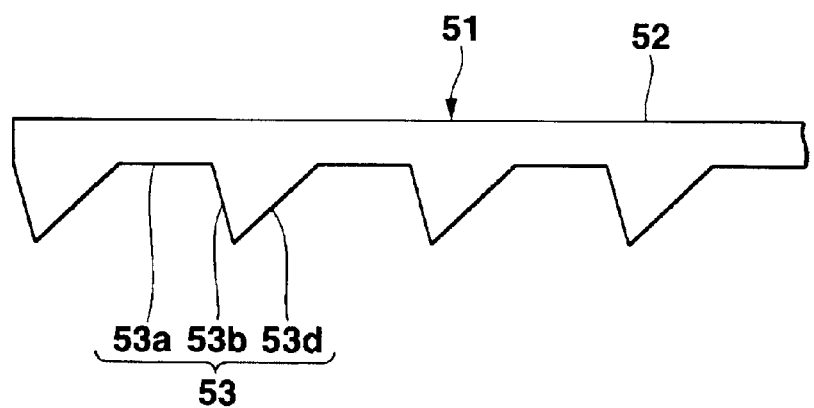
FIG. 10 is an enlarged side view of a second example of modification of the optical sheet shown in FIG. 8.
Figure 11:
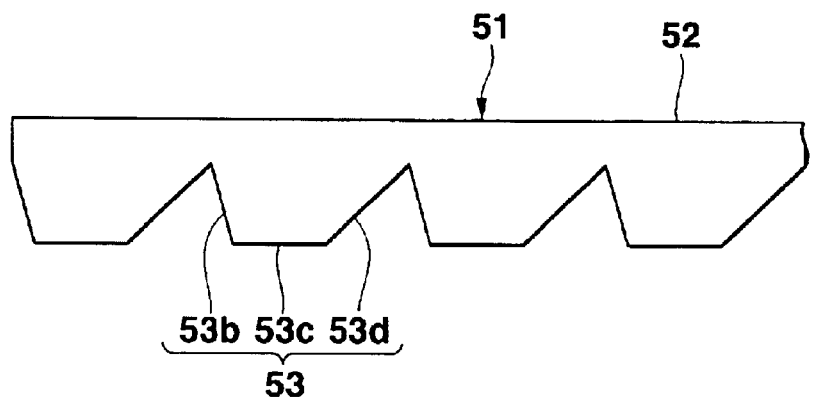
FIG. 11 is an enlarged side view of a third example of modification of the optical sheet shown in FIG. 8.
Figure 12:
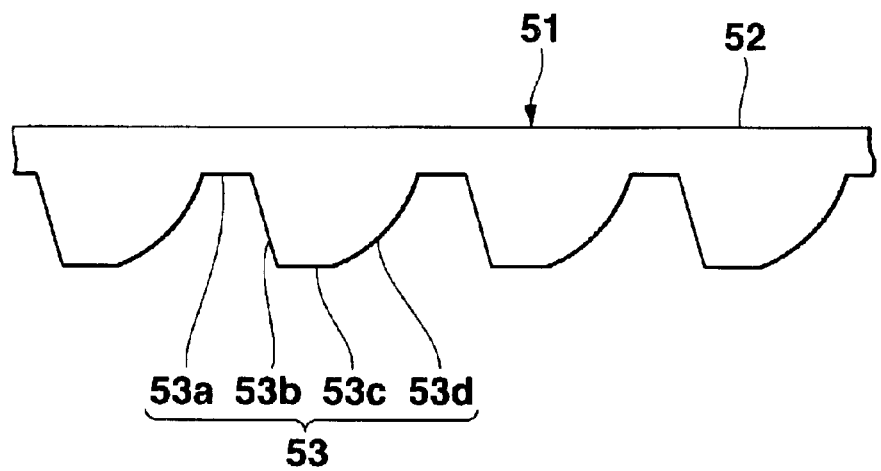
FIG. 12 is an enlarged side view of a fourth example of modification of the optical sheet shown in FIG. 8.

With reference to FIG. 9, it is necessary only that the optical surface 53 of the optical sheet 51 have the flat surface 53a or 53c to pass through the rays of light indicated by the arrows J, K without any change, and the inclined surface 53b to cause the ray of light indicated by the arrow L to be incident, and the inclined surface 53d to reflect the ray of light indicated by the arrow L. Therefore, the optical surface 53 of the optical sheet 51 may be a surface having the flat surface 53a, inclined surface 53b and inclined surface 53d, for example, as shown in FIG. 10. Alternately the optical surface 53 of the optical sheet 51 may be a surface having the inclined surface 53b, flat surface 53c and inclined surface 53d, for example, as shown in FIG. 11.

Alternately the inclined surface 53d to reflect light caused to be incident on the inclined surface 53b may be a curved surface in the shape of a circular arc. In this case, it is possible to collect light reflected by the inclined surface of circular arc shape 53d and to emit the light from the flat surface 52 in a direction substantially perpendicular thereto. Therefore, the peak luminance on the front surface of the liquid crystal display panel 21 can be further increased.

Figure 13:
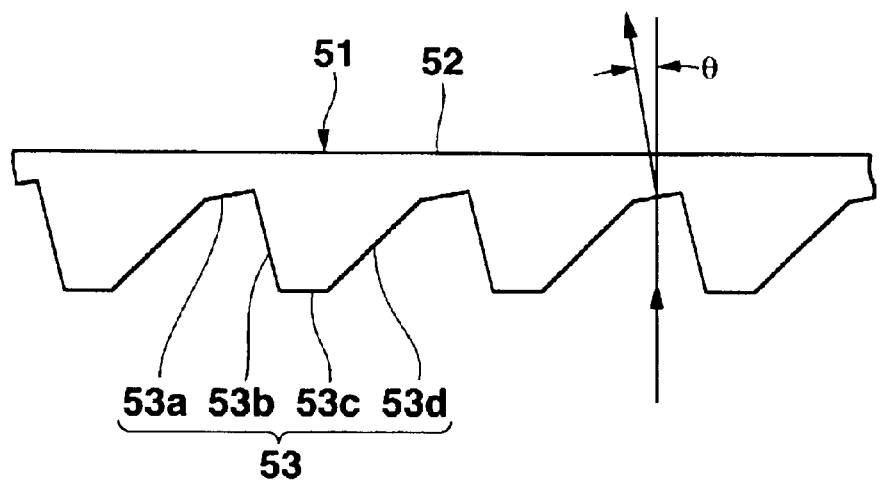
FIG. 13 is an enlarged side view of a fifth example of modification of the optical sheet shown in FIG. 8.

Furthermore, as shown in FIG. 13, for example, the bottom surface of the groove may be an inclined surface having an inclination angle of not more than 20° or so with the flat surface 53c (which is parallel to the emission surface 33 of the light guide plate 32) as indicated by the reference numeral 53a. For example, if the inclination angle of the inclined surface 53a with the flat surface 53c is 20° and the refractive index of the optical sheet 51 (an acrylic resin which is a material therefor) is 1.49, then as indicated by the arrow in FIG. 13, light emitted from the emission surface 33 of the light guide plate 32 in a direction substantially perpendicular thereto and caused to be incident on the inclined surface 53a, is emitted from the flat surface 52 at an angle of θ (10.06°) with a perpendicular thereof. If an angle θ=±10° or so is defined as a substantially perpendicular direction, then an inclination angle of the inclined surface 53a of not more than 20° or so with the flat surface 53c is quite permissible.

Next, a case where the liquid crystal display device shown in FIG. 9 is used as a transmission type will be described below.

When the cold cathode fluorescent tube 37 is lighted, light coming from the cold cathode fluorescent tube 37 and light reflected by the reflecting sheet 38 are caused to be incident on the incidence surface 34 of the light guide plate 32, propagate within the light guide plate 32, and are reflected by the incidence surface 34 of the light guide plate 32. Part of the light reflected by the optical surface 35 of the light guide plate 32 is emitted from the emission surface 33 in a direction substantially perpendicular thereto, as indicated by the arrow of solid line in FIG. 7, and passes through the flat surfaces 53a, 53c of the optical sheet 51 without any change the light is then emitted from the flat surface 52 of the optical sheet 51 in a direction substantially perpendicular thereto as representative rays of light indicated by the arrows J, K in FIG. 9. Almost all of the remainder of the light by the optical surface 35 of the light guide plate 32 is emitted from the emission surface 33 of the light guide plate 32 in a slant direction toward the side on which the light becomes distant from the incidence surface, caused to be incident on the inclined surface 53b of the optical sheet 51, reflected by the inclined surface 53d, and emitted from the emission surface 52 of the optical sheet 51 in a direction substantially perpendicular thereof, as the representative ray of light indicated by the arrow L in FIG. 9.

Also in this case of the second embodiment, almost all of the light coming from the cold cathodic fluorescent tube 37 and caused to be incident on the incident surface 34 of the light guide plate 32, is eventually emitted from the flat surface of the optical sheet 51 in a direction substantially perpendicular thereto. In the second embodiment, the light guide plate 32 is constructed, as shown in FIG. 2, the height H of the inclined surface 35c increases in proportion to the distance from the incidence surface 34 and the length of the flat surface 35b decreases in proportion to the distance from the incidence surface 34. Therefore, the amount of light which is reflected by the inclined surface 35c and propagates toward the emission surface 33 increases exponentially in proportion to the distance from the emission surface 33. As a result, even when the amount of light decreases with increasing distance from the cold cathodic fluorescent tube 37, the amount of light emitted from the emission surface 33 is made uniform. Therefore, it is possible to increase luminance by improving the utilization efficiency of light and besides luminance can be made uniform.

Light emitted from the flat surface 52 of the optical sheet 51 in a direction substantially perpendicular thereto is caused to be incident on the rear surface of the liquid crystal display panel 21 and caused to irradiate the liquid crystal display panel 21 from the rear surface side thereof. Then, image light corresponding to the display drive of the liquid crystal display panel 21 is emitted from the front surface of the liquid crystal display panel 21.

As described above, when the liquid crystal display device shown in FIG. 8 is used as a transmission type, luminance can be increased by improving the utilization efficiency of light by the lighting panel 31 and besides luminance can be made uniform. Therefore, display quality can be improved.

On the other hand, when this liquid crystal display device is used as a reflection type, external light is used without lighting the cold cathode fluorescent tube 37. That is, external light caused to be incident on the front surface of the liquid crystal display panel 21 from the front surface side thereof passes through the liquid crystal display panel 21, passes through the optical sheet 51, is caused to be incident on the emission surface 33 of the light guide plate 32, and is reflected by the reflecting layer 36. In this case, external light, such as natural light and room light, passes through portions corresponding to the flat surfaces 53a, 53c of the optical sheet 51 with its angle scarcely changed. Contrary to the foregoing, this incident light is emitted from the emission surface 33 of the light guide plate 32, passes through the optical sheet 51, is caused to be incident on the rear surface of the liquid crystal display panel 21, and caused to irradiate the liquid crystal display panel 21 from the rear surface side thereof. Then, image light corresponding to the display drive of the liquid crystal display panel 21 is emitted from the front surface of the liquid crystal display panel 21. In this case, doubling can be reduced owing to the optical sheet 51.

Embodiment 3

In the above first and second embodiments, as shown in FIGS. 1 and 8, the case where the lighting panel 31 is disposed on the rear surface side of the liquid crystal display panel 21. However, in addition to this case, the lighting panel 31 may be disposed on the front surface side of the liquid crystal display panel 21 as in a third embodiment of the invention shown in FIG. 14.

In this case, the emission surface 33 of the light guide plate 32 of lighting panel 31 is on the rear surface side and the optical surface 35 is on the front surface side. The reflecting layer 36 is not provided on the optical surface 35 of the light guide plate 32. Between the liquid crystal display panel 21 and the lighting panel 31 is disposed an optical sheet 51 like that of the second embodiment. In this optical sheet 51, the flat surface 52 faces the liquid crystal display panel 21. A reflector 55 in the shape of a flat plate is provided on the rear surface side of the liquid crystal display panel 21.

Next, a case where the liquid crystal display device shown in FIG. 14 as a transmission type will be described below.

When the cold cathode fluorescent tube 37 is lighted, light coming from the cold cathode fluorescent tube 37 and light reflected by the reflecting sheet 38 are caused to be incident on the incidence surface 34 of the light guide plate 32. As with the case of the above second embodiment, almost all of this incident light is emitted from the emission surface 33 of the light guide plate 32 and then emitted from the flat surface 52 of the optical sheet 51 in a direction substantially perpendicular thereto.

This emitted light passes through the liquid crystal panel 21 and is reflected by the reflector 55. This reflected light is caused to be incident on the rear surface of the liquid crystal display panel 21 and to irradiate the liquid crystal display panel 21 from the rear surface side thereof. Then, image light corresponding to the display drive of the liquid crystal display panel 21 is emitted from the front surface of the liquid crystal display panel 21. This image light passes through the optical sheet 51 first and then the light guide plate 32. This transmitted image light is visually recognized.

Figure 14:
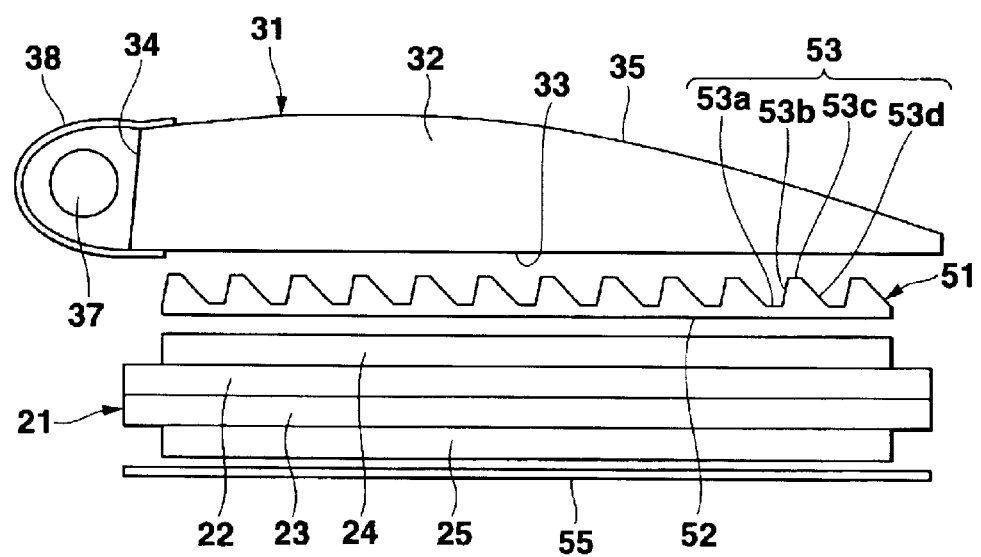
FIG. 14 is a side view of part of a liquid crystal display device related to a third embodiment of the invention.

On the other hand, when the liquid crystal display device shown in FIG. 14 is used as a reflection type, external light is used without lighting the cold cathode fluorescent tube 37. That is, external light caused to be incident on the optical surface 35 of the light guide plate 32 from the front surface side thereof passes through the light guide plate 32, optical sheet 51 and liquid crystal display panel 21 in this order and is reflected by the reflector 55. This reflected light is caused to be incident on the rear surface of the liquid crystal display panel 21 and to irradiate the liquid crystal display panel 21 from the rear surface side thereof. Then, image light corresponding to the display drive of the liquid crystal display panel 21 is emitted from the front surface of the liquid crystal display panel 21. This image light passes through the optical sheet 51 first and then the light guide plate 32.

When used as a transmission type and as a reflection type, in the liquid crystal display device shown in FIG. 14, light passes through the liquid crystal display panel 21 twice and, therefore, only one polarizer either on the front surface side or the rear surface side may be used. Furthermore, the electrode for display pixels provided on the inner surface of a rear glass substrate 23 may be formed from a reflective metal without using the reflector 55.

Embodiment 4

In each of the above embodiment, the cases where a line or linear light source, such as a cold cathode fluorescent tube, is used as the light source were described. However, in stead of this light source, a point or spot light source such as a light-emitting diode may be used. In the fourth embodiment shown in FIG. 15, one light-emitting diode 61 is disposed in a position opposed to the middle of the longitudinal direction of an incidence surface 34 of a light guide plate 32 of the liquid crystal display device. The same luminance as in the case of a line light source can be obtained if a plurality of light-emitting diodes 61 are provided along the longitudinal direction of the incidence surface 34 in place of this arrangement.

Figure 15:
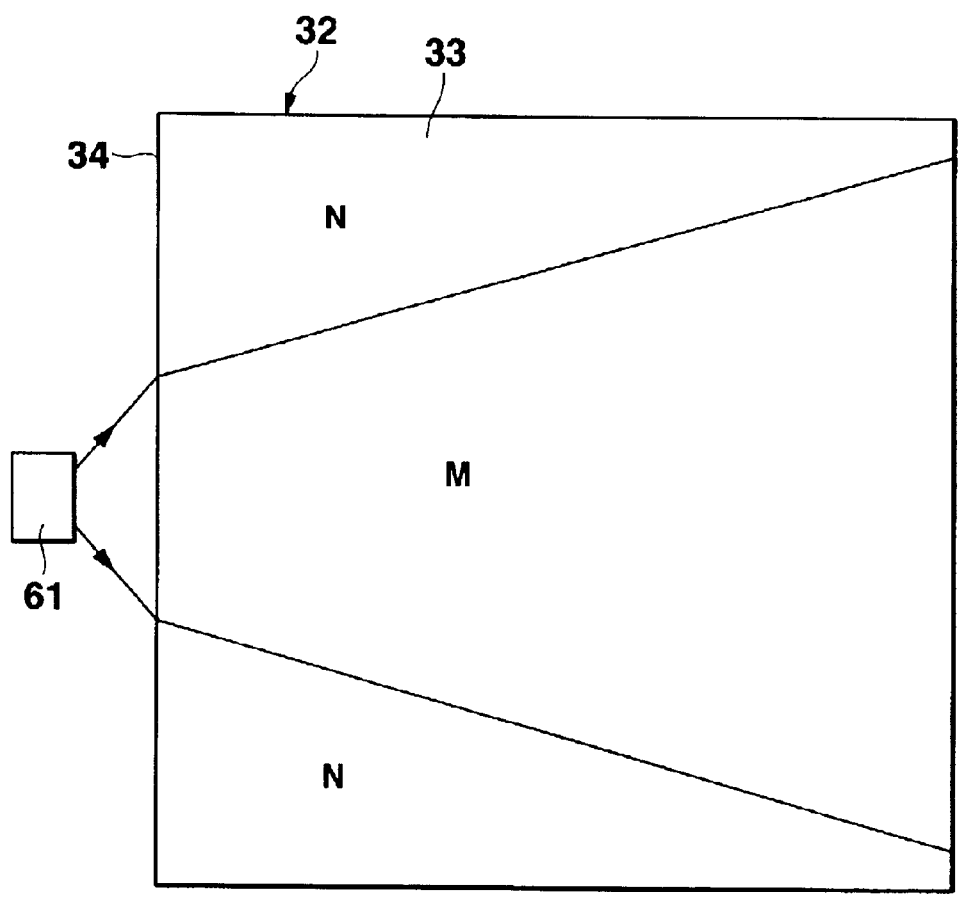
FIG. 15 is a side view of part of a liquid crystal display device related to a fourth embodiment of the invention.

When a cold cathode fluorescent tube 37 is used as a line light source, the whole of the incidence surface 34 of the light guide plate 32 can be irradiated with the light coming from the cold cathode fluorescent tube 37. In contrast to this, in the case of the use of one light-emitting diode 61 as a point light source, it is impossible to uniformly irradiate the incidence surface 34 of the light guide plate 32 with the light coming from the light-emitting diode 61. For this reason, in the case of the use of the light-emitting diode 61, in an imaginary plane Q perpendicular to an emission surface 33 of the light guide plate parallel to the incidence surface 34, which is indicated by alternate long and short dash lines in FIG. 16, only the light coming from the light-emitting diode 61 which is caused to incidence on the incidence surface 34 is emitted in a direction perpendicular to the emission surface 33, as indicated by the arrow of solid line, and other light is emitted at an angle inclined with respect to the imaginary plane Q. That is, light emitted from the point light source other than the light caused to be incident perpendicularly on the incidence surface 34 is emitted in right and left slant directions in the imaginary plane, as indicated by the arrows of dotted line. Therefore, as shown in FIG. 15, in the regions indicated by the symbol N on both sides of the region indicated by the symbol M, which is almost opposed to the light-emitting diode 61, luminance decreases greatly, the utilization efficiency of light is low and besides nonuniform luminance occurs. As a result, nonuniform display occurs in the liquid crystal display panel.

Next, therefore, the fifth embodiment of the invention which prevents the occurrence of this nonuniform luminance will be described below.

Embodiment 5

Figure 17:
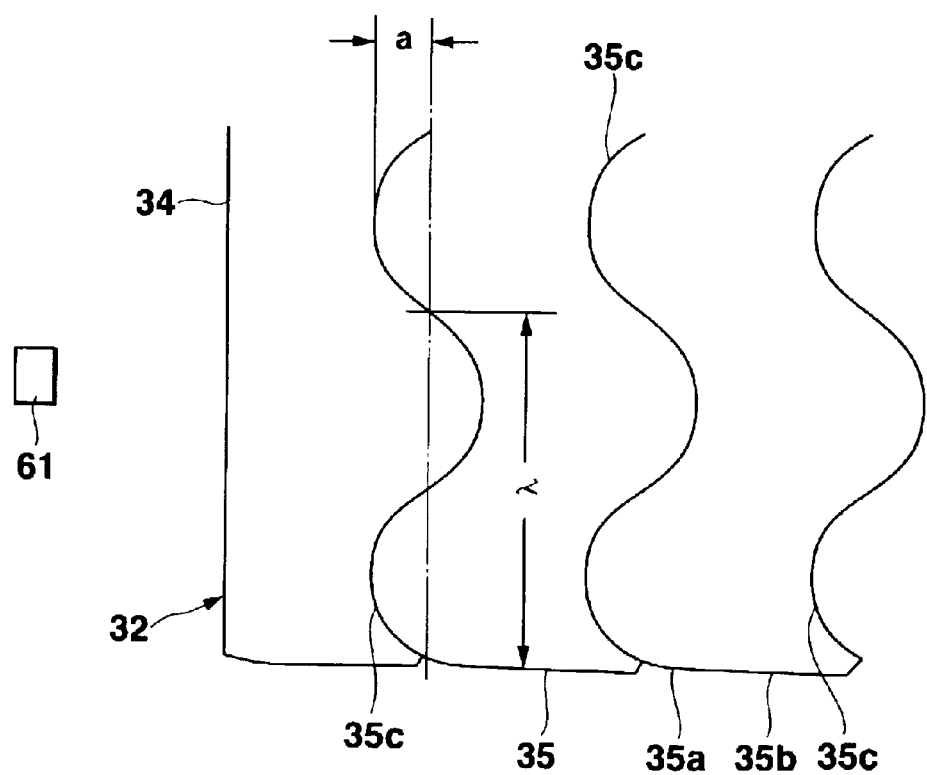
FIG. 17 is a schematic perspective view of a liquid crystal display device related to a fifth embodiment of the invention.

FIG. 17 is a schematic plan view of part of a liquid crystal display device to explain the apparatus related to the fifth embodiment of the invention.

In the liquid crystal display device of this embodiment, basically as in the case shown in FIG. 15, one light-emitting diode 61 is disposed in a position opposed to the middle of the longitudinal direction of an incidence surface 34 of a light guide plate 32. In this case, an inclined surface 35c of each set of optical elements that constitute an optical surface of the light guide plate 32 is a cocavo-convex surface showing wave forms in the longitudinal direction of the inclined surface 35c (a direction parallel to the incidence surface 34). An appropriate shape of wave of the inclined surface 35c of each set of optical elements is, for example, a sine curve with a wavelength $\lambda$ of $2 a\pi$ when amplitude is expressed by $\underline{a}$. However, the wave shape is not limited to this and the wavelength $\lambda$ may be about 1 to 10 times the amplitude $\underline{a}$.

Figure 16:
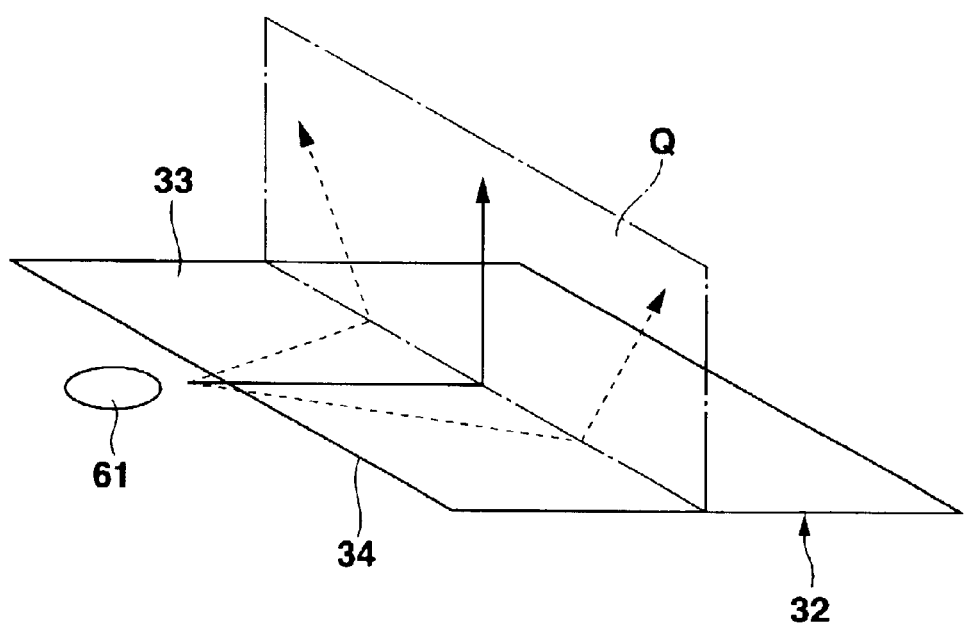
FIG. 16 is an explanatory diagram of how the light which is incident on a light guide plate from a point light source is emitted from an imaginary plane Q.

When the inclined surface 35c of each set of optical elements has a wave shape as in this case, in an imaginary plane Q indicated by alternate long and short dash lines in FIG. 16 (a plane parallel to the incidence surface 34 on the emission side of a emission surface 33), light coming from the light-emitting diode 61 is caused to be incident perpendicularly on the inclined surface 35c of the wave form of each set of optical elements. This light coming from the light-emitting diode 61 includes not only light caused to be incident perpendicularly on the incident surface 34, but also part of light caused to be incident slantly on the incident surface 34 as indicated by the arrows of solid line. In this manner, light caused to be perpendicularly on the inclined surfaces 35c of wave form of each set of optical elements is reflected in a direction perpendicular to the emission surface 33 of the light guide plate. Therefore, the intensity of emitted light in the visual direction is increased and at the same time the intensity of emitted light emitted from the emission surface 33 of the light guide plate is made uniform.

In the embodiment shown in FIG. 17, the center line of the inclined surface 35c of wave form formed on the light guide plate 32 is a straight line parallel to the incidence surface 34. However, the profile of the center line of the inclined surface 35c of wave form may be appropriately modified and this profile may be, for example, an arc or ellipse with the light source serving as the center. Furthermore, in each of the inclined surfaces 35c, the wave phase may be shifted in the width direction of the light guide plate 32 and moreover the wave pitch may be not the same.

A further detailed examination will be conducted below with reference to FIG. 18. As indicated by the arrows of dotted line, another portion of the light reflected by the inclined surface 35c of each set of optical elements of wave form propagates in the right and left slant directions in an imaginary plane Q and, therefore, the intensity of light becomes nonuniform by this portion.

Therefore, the sixth embodiment of the invention that enables light to be more uniformly emitted from the emission surface 34 of the light guide plate 32 will be described below.

Embodiment 6

Figure 19:
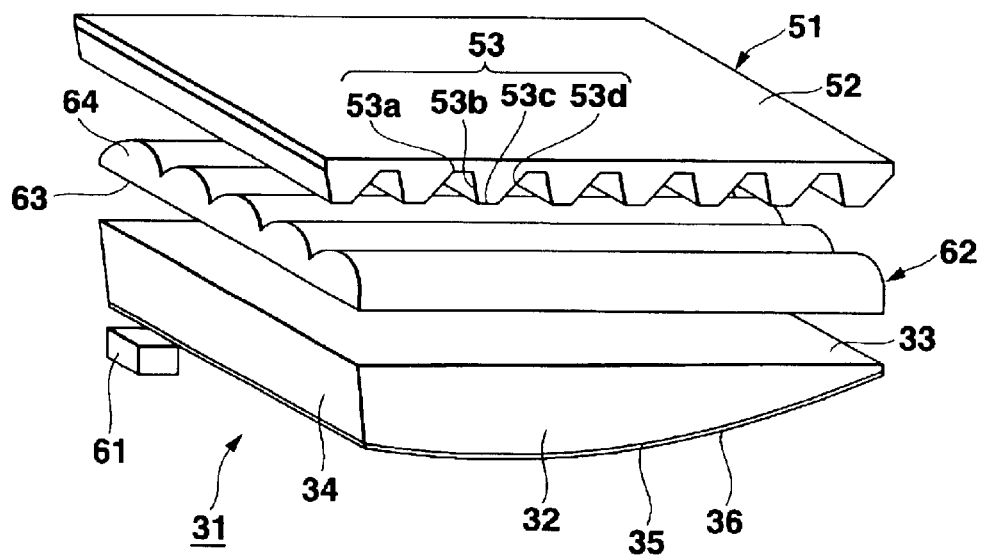
FIG. 19 is a side view of part of a liquid crystal display device related to a sixth embodiment of the invention.

FIG. 19 is a perspective view of part of a lighting panel 31 in the sixth embodiment of the invention. In this lighting panel 31, a light-collecting sheet 62 is disposed between a light guide plate 32 and an optical sheet 51, and one light-emitting diode 61 is disposed in a position opposed to the middle of the longitudinal direction of an incidence surface 34 of the light guide plate 32.

The light-collecting sheet 62 has a flat square shape and the surface opposed to the light guide plate 32 is a flat surface 63. A large number of one-side convex-lens ridge portions 64, which extend in a direction perpendicular to the incidence surface 34 of the light guide plate 32, are provided side by side on the flat surface 63. The surface of the one-side convex-lens ridge portion 64 may has a section in the shape of a circle or a section in the shape of an ellipse. The light-collecting sheet 62 of such a construction as described above can be manufactured by injection compression molding from transparent resins of good light transmission properties, such as acrylic resins. The flat surface 63 of the light-collecting sheet 62 may be bonded to the emission surface 33 of the light guide plate 32.

Figure 18:
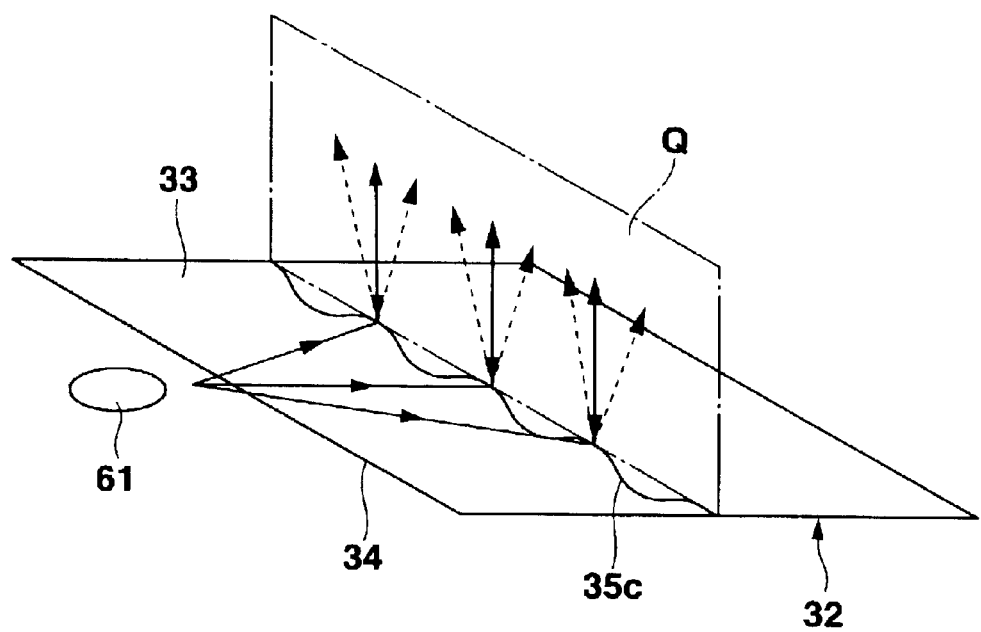
FIG. 18 is an explanatory diagram of how the light which is incident on a light guide plate from a point light source is emitted from an imaginary plane Q in the embodiment shown in FIG. 17.
Figure 20:
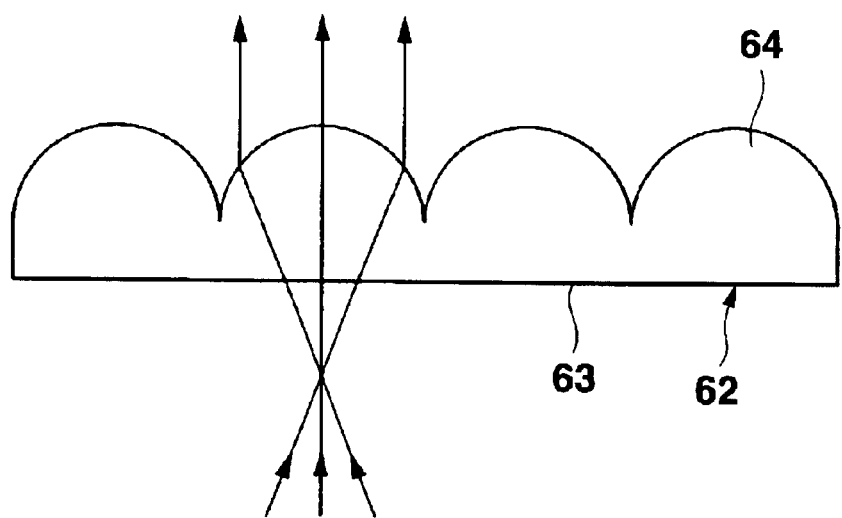
FIG. 20 is an explanatory diagram of an action of a light-collecting sheet shown in FIG. 19.

And as indicated by the arrows of dotted line in FIG. 18, light emitted, in the imaginary plane Q, from the emission surface 33 of the light guide plate 32 in the right and left directions thereof is emitted by the one-side convex-lens ridge portions 64 of the light-collecting sheet 62 in a direction substantially perpendicular to the flat surface 63 of the light-collecting sheet 62, as indicated by the arrows of solid line in FIG. 20. That is, as indicated by the arrows of solid line and dotted line in FIG. 18, light emitted from the emission surface 33 of the light guide plate 32 in a direction parallel to the incidence surface 34 is collected by the light-collecting sheet 62 and is then refracted, in the imaginary plane Q, toward a direction substantially perpendicular to the flat surface 63 of the light-collecting sheet 62 (a direction parallel to the arrows of solid line) and emitted.

Therefore, even when the incidence surface 34 cannot be uniformly irradiated with the light coming from the light-emitting diode 61, the light coming from the flat surface 63 of the light-collecting sheet 62 is more uniformly emitted, the utilization efficiency of light is good and luminance is also improved. As a result of this, it is possible to ensure that nonuniform display does not occur on the liquid crystal display panel. Incidentally, it is also possible that in the foregoing, the incidence surface 34 of the light guide plate 32 is given the same shape of wave form as with the inclined surface 35c. In this case, however, it is necessary to use care so that the amount of light caused to be incident on the light guide plate 32 does not become nonuniform.

When the liquid crystal display device comprising the lighting panel 31 shown in FIG. 19 is used as a reflection type, it is possible to improve the external-light capture efficiency because the surfaces of the one-side convex-lens ridge portions 64 of the light-collecting sheet 62 have no apex angle.

Figure 21:
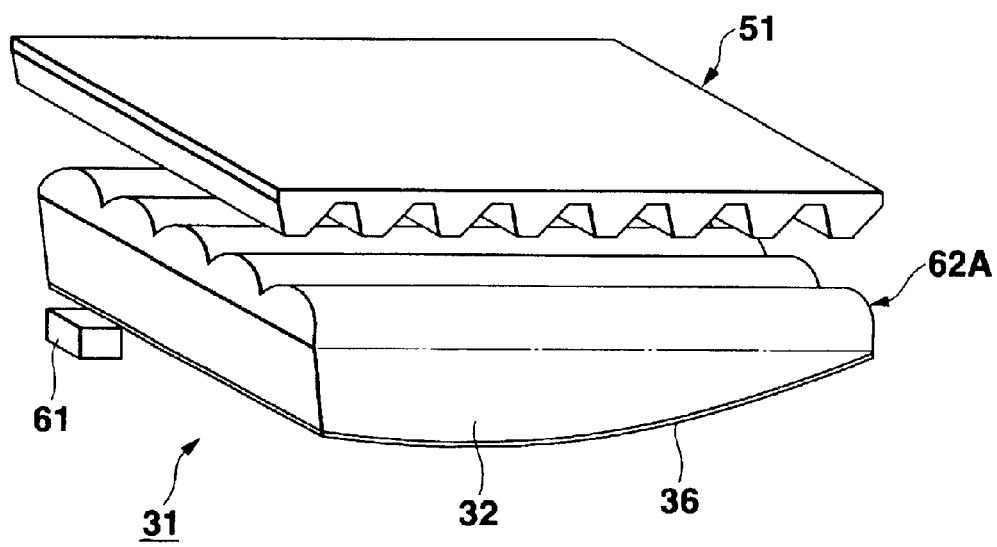
FIG. 21 is a view of a first example of a lighting panel shown in FIG. 19.
Figure 22:
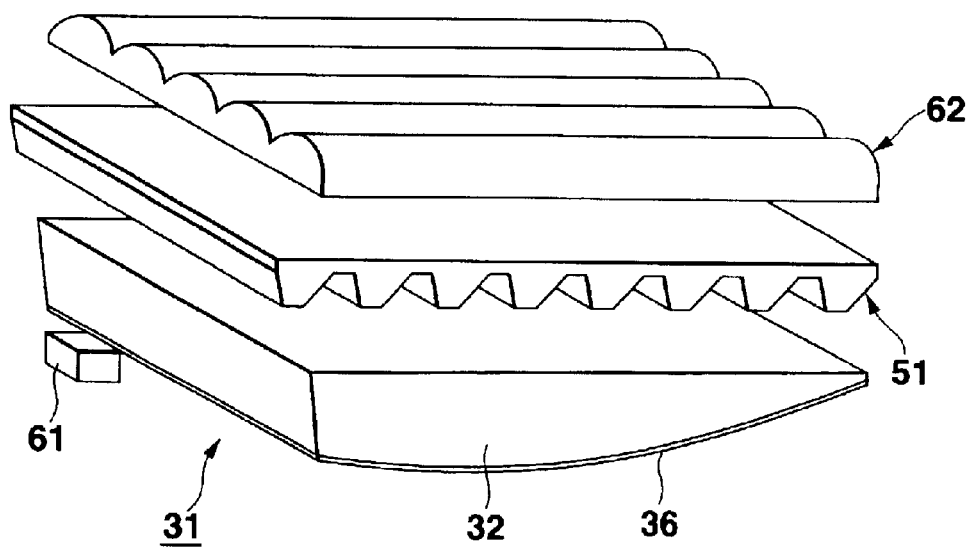
FIG. 22 is a view of a second example of the lighting panel shown in FIG. 19.

FIG. 21 shows a first example of modification of the sixth embodiment. In this modification, on the surface of a light guide plate 32 is integrally formed a light-collecting portion 62A having the same construction as the light-collecting sheet 62 shown in FIG. 19. FIG. 22 shows a second example of modification of the sixth embodiment. In this example of modification, an optical sheet 51 is disposed between a light guide plate 32 and a light-collecting sheet 62. The light-collecting sheet 62 and optical sheet 51 are respectively the same as those shown in FIG. 19.

Furthermore, though not shown in the figure, there may be provided an optical film that combines the function of the optical sheet 51 and the function of the light-collecting sheet 62, instead of the sheets 51, 62. That is, the former function is to convert light emitted in a slant direction from the emission surface 33 of the light guide plate 32 toward the side of the end surface 32a into light to be emitted in a direction substantially perpendicular to this emission surface 33. The latter function is to convert light emitted in a slant direction from the emission surface 33 of the light guide plate 32 in a plane parallel to the incidence surface 34 of the light guide plate 32 (in an imaginary plane Q) into light to be emitted from the front surface of said optical sheet in a direction substantially perpendicular to the emission surface 33. Such an optical film as described above can be obtained by integrating, for example, the optical sheet 51 and the light-collecting sheet 62 shown in FIG. 22 together in such a manner that the flat surfaces of the respective sheets come into close contact with each other, the embodiment being not limited thereby.

Furthermore, in the cases shown in FIGS. 19, 21 and 22, a cold cathode fluorescent tube (a line light source) may be used in place of the light-emitting diode 61. In such cases, luminance can be further increased by the light-collecting action in a direction parallel to the incidence surface 34 of the light-guiding plate 32 by the light-collecting sheet 62.

When a light-emitting diode is used as a light source, the number of light-emitting diodes is not limited to one and a plurality of light-emitting diodes may be used. In this case, even when the light-emitting diodes themselves show nonuniformity in color, it is possible to ensure that the nonuniformity in color is not easily discerned with the aid of the shape of wave form of the inclined surface 35c of the light guide plate 32. In this case, by using light-emitting diodes that respectively emit light three primary colors, it is possible to perform white color or full color display as described in the following seven embodiment.

Embodiment 7

Figure 23:
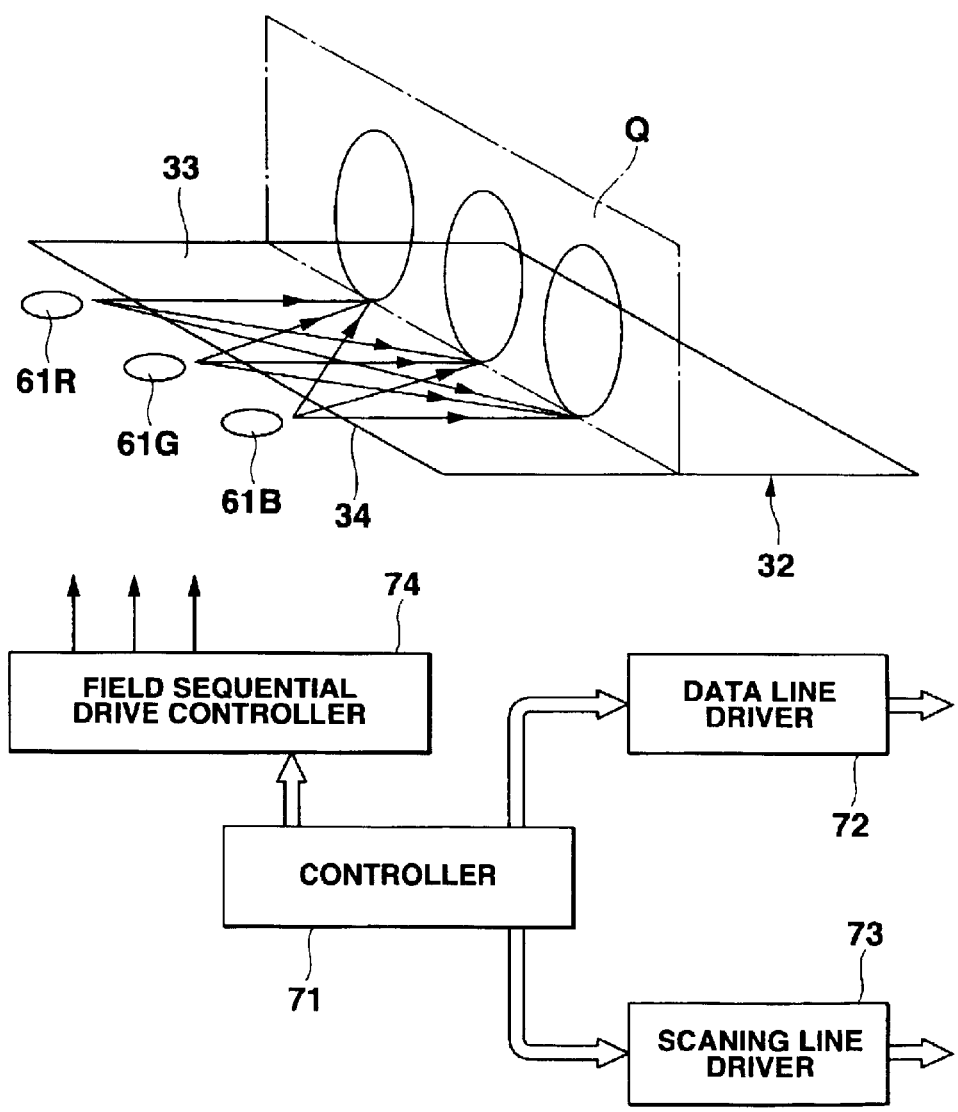
FIG. 23 is a schematic perspective view of a liquid crystal display device related to a seventh embodiment of the invention.
Figure 24:
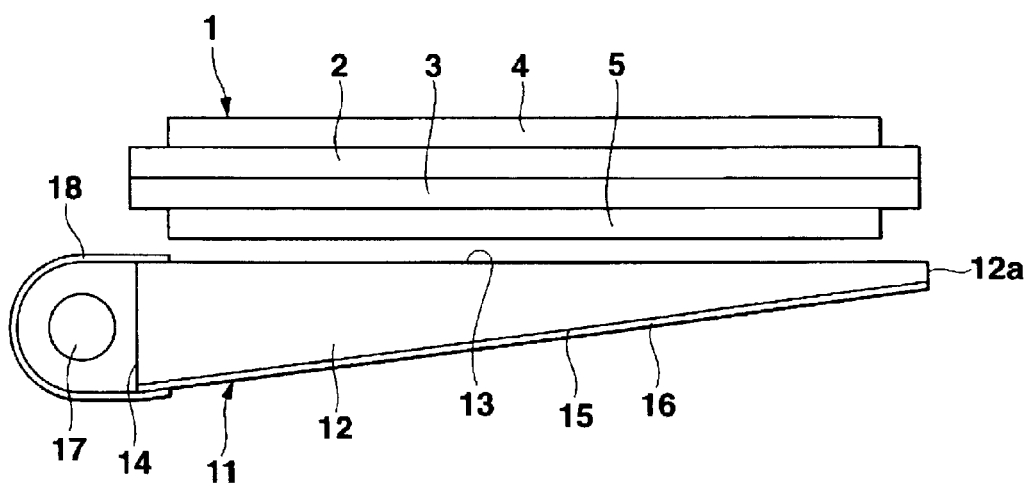
FIG. 24 is a side view of part of an example of a conventional liquid crystal display device.

FIG. 23 shows a seventh embodiment of the invention. In the seventh embodiment, a plurality of light-emitting diodes of different luminescent colors are arranged along a longitudinal direction of an incidence surface 34 of a light guide plate 32. The light-emitting diodes are, for example, three diodes 61R, 61G and 61B that emit red light, green light and blue light, respectively. In this case, light of any mixed color can be emitted by turning on at least two of the three light-emitting diodes 61R, 61G and 61B at the same time.

In this embodiment, field sequential drive is performed to display full-color images, without using color filters. A controller 71 generates a horizontal control signal and a vertical control signal, which control a data line driver 72, a scanning line driver 73 and a field sequential drive controller 74. The field sequential drive is carried out in three sub-field periods, i.e., first to third sub-field periods that define one field period.

In the first sub-field period, the scanning line driver 73 scans the scanning lines of the liquid crystal display panel, and the data line driver 72 supplies gray scale data for red to the data lines at the timing of scanning the scanning lines. The liquid crystal panel is thereby driven. In synchronism with the driving of the liquid crystal panel, the field sequential drive controller 74 supplies a drive signal to the light-emitting diode 61R.

In the second sub-field period, the scanning line driver 73 scans the scanning lines of the liquid crystal display panel, and the data line driver 72 supplies gray scale data for green to the data lines at the timing of scanning the scanning lines. The liquid crystal panel is thereby driven. In synchronism with the driving of the liquid crystal panel, the field sequential drive controller 74 supplies a drive signal to the light-emitting diode 61G.

In the third sub-field period, the scanning line driver 73 scans the scanning lines of the liquid crystal display panel, and the data line driver 72 supplies gray scale data for blue to the data lines at the timing of scanning the scanning lines. The liquid crystal panel is thereby driven. In synchronism with the driving of the liquid crystal panel, the field sequential drive controller 74 supplies a drive signal to the light-emitting diode 61B.

In the field sequential drive thus performed, too, a light-collecting sheet 62 collects light beams propagating parallel to the incidence surface 34 of the light guide plate 32. Hence, the luminance efficiency can be increased.

According to a first aspect of the invention, owing to the optical surface formed on the light guide plate, which has a curved surface and an inclined surface, also on a distal end remote from an incidence surface of the light guide plate, light introduced from the incidence surface is sufficiently refracted to the side of an emission surface of the light guide plate. Therefore, the utilization efficiency of light can be improved.

According to a second aspect of the invention, light introduced from a point light source is refracted in a direction parallel to an incidence surface by means of an inclined surface which is extended in a direction substantially parallel to the incidence surface. Therefore, the utilization efficiency of light can be improved.

As described above, according to a third aspect of the invention, light emitted in a slant direction from an emission surface of a light guide plate toward the side of an end surface is converted by means of an optical sheet in a direction substantially perpendicular to the emission surface of the light guide plate. Therefore, the utilization efficiency of light can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lighting panel comprising:
    a light source; and
    a light guiding plate comprising:
        an incidence surface on which light emitted from said light source is incident,
        an end surface formed on a side of said light guiding plate opposed to said incidence surface,
        an emission surface which emits light introduced from said incidence surface, and
        an optical surface having a surface opposed to said emission surface;
    wherein said optical surface includes a large number of continuous optical elements, and each optical element includes (i) a curved surface which refracts part of light introduced from said incidence surface toward said end surface at a low angle along a surface parallel to said emission surface, and (ii) an inclined surface which refracts part of light refracted by said curved surface toward said emission surface.

2. The lighting panel according to claim 1, wherein said curved surface of each optical element has a curve which drops gradually from a side of said optical surface adjacent to said incidence surface toward a side of said optical surface adjacent to said end surface.

3. The lighting panel according to claim 2, wherein said curved surface of each optical element includes a circular arc shaped section.

4. The lighting panel according to claim 1, wherein each of said optical elements includes a flat surface between said curved surface and said inclined surface.

5. The lighting panel according to claim 4, wherein a height of the inclined surface of an n-th optical element counted from a side of said optical surface adjacent to said incidence surface, relative to said flat surface is $$an(n+1)/2$$

where $a$ is an arbitrary number.

6. The lighting panel according to claim 4, wherein an inclination angle of the inclined surface of each of said optical elements relative to said flat surface is approximately 40 to 50°.

7. The lighting panel according to claim 4, wherein an inclination angle of the inclined surface of each of said optical elements relative to said flat surface is larger on a side of said optical surface adjacent to said incidence surface than on a side of said optical surface adjacent to said end surface.

8. The lighting panel according to claim 1, wherein a height of said inclined surface of each of said optical elements is smaller in positions on a side of said optical surface adjacent to said incidence surface than in positions on a side of said optical surface adjacent to said end surface.

9. The lighting panel according to claim 1, wherein a thickness of the end surface is smaller than a thickness of said incidence surface and a portion of maximum thickness of said light guiding plate is present between said incidence surface and said end surface.

10. The lighting panel according to claim 1, wherein lengths of said optical elements are substantially the same.

11. The lighting panel according to claim 1, wherein a length of each of said optical elements is smaller on a side of said optical surface adjacent to said end surface than on a side of said optical surface adjacent to said incidence surface.

12. The lighting panel according to claim 1, wherein a length of each of said optical elements is in a range of 20 to 500 μm.

13. The lighting panel according to claim 1, wherein a radius of curvature of said curved surface is in a range of 0.1 to 2.0 mm.

14. The lighting panel according to claim 1, further comprising a reflecting layer provided on a rear surface of said light guiding plate.

15. The lighting panel according to claim 1, further comprising an optical sheet disposed on a side of the emission surface of said light guiding plate,
    wherein said optical sheet includes a first region for transmitting, without any refraction, light emitted from the emission surface of said light guiding plate in a direction substantially perpendicular to said emission surface and a second region for converting light emitted in a slant direction from the emission surface of said light guiding plate toward the end surface of said light guiding plate into light to be emitted from a front surface of said optical sheet in a direction substantially perpendicular to the emission surface of said light guiding plate.

16. The lighting panel according to claim 15, further comprising a light-collecting sheet disposed on one of (i) a side of the front surface of said optical sheet and (ii) between said light guiding plate and said optical sheet,
    wherein said light-collecting sheet converts light emitted in a slant direction from the emission surface of said light guiding plate in a plane parallel to the incidence surface of said light guiding plate into light to be emitted from a front surface of said light-collecting sheet in a direction substantially perpendicular to the emission surface of said light guiding plate.

17. A display device comprising:
    a display panel having a front surface on which display images are adapted to be visually recognized and a rear surface opposed to the front surface; and
    a lighting panel disposed on a side of one of the front surface and the rear surface of said display panel; said lighting panel including:
        a light source; and
        a light guiding plate comprising (i) an incidence surface on which light coming from said light source is incident, (ii) an end surface formed on a side of said light guiding plate opposed to said incidence surface, (iii) an emission surface which emits light introduced from said incidence surface, and (iv) an optical surface having a surface opposed to said emission surface;
    wherein said optical surface includes a large number of continuous optical elements, and each optical element includes (i) a curved surface which refracts part of light introduced from said incidence surface toward said end surface at a low angle along a surface parallel to said emission surface, and (ii) an inclined surface which refracts part of light refracted by said curved surface toward the emission surface.

18. The display device according to claim 17, wherein said curved surface of each optical element includes a curve which drops gradually from a side of said optical surface adjacent to said incidence surface toward a side of said optical surface adjacent to said end surface.

19. The display device according to claim 17, wherein said curved surface of each optical element includes a circular arc shaped section.

20. The display device according to claim 17, wherein each of said optical elements includes a flat surface between said curved surface and said inclined surface.

21. The display device according to claim 20, wherein a height of the inclined surface of an n-th optical element counted from a side of said optical surface adjacent to said incidence surface, relative to said flat surface is $$an(n+1)/2$$

where $a$ is an arbitrary number.

22. The display device according to claim 20, wherein an inclination angle of the inclined surface of each of said optical elements relative to said flat surface is approximately 40 to 50°.

23. The display device according to claim 20, wherein an inclination angle of the inclined surface of each of said optical elements relative to said flat surface is larger on a side of said optical surface adjacent to said incidence surface than on a side of said optical surface adjacent to said end surface.

24. The display device according to claim 17, wherein a height of the inclined surface of each of said optical elements is smaller in positions on a side of said optical surface adjacent to said incidence surface than in positions on a side of said optical surface adjacent to said end surface.

25. The display device according to claim 17, wherein a thickness of said end surface is smaller than the thickness of said incidence surface and a portion of maximum thickness of said light guiding plate is present between said incidence surface and said end surface.

26. The display device according to claim 17, wherein lengths of said optical elements are substantially the same.

27. The display device according to claim 17, wherein a length of each of said optical elements is smaller on a side of said optical surface adjacent to said end surface than on a side of said optical surface adjacent to said incidence surface.

28. The display device according to claim 17, wherein a length of each of said optical elements is in the range of 20 to 500 μm.

29. The display device according to claim 17, wherein a radius of curvature of said curved surface is in the range of 0.1 to 2.0 mm.

30. The display device according to claim 17, wherein a reflecting layer is provided on a rear surface of said light guiding plate.

31. The display device according to claim 17, wherein said lighting panel further comprises an optical sheet disposed on a side of the emission surface of said light guiding plate,
wherein said optical sheet includes (i) a first region for transmitting, without any refraction, light emitted from the emission surface of said light guiding plate in a direction substantially perpendicular to said emission surface and, (ii) a second region for converting light emitted in a slant direction from the emission surface of said light guiding plate toward the end surface of said light guiding plate into light to be emitted from a front surface of said optical sheet in a direction substantially perpendicular to the emission surface of said light guiding plate.

32. The display device according to claim 31, wherein said lighting panel further comprises a light-collecting sheet disposed on one of (i) a side of the front surface of said optical sheet and (ii) between said light guiding plate and said optical sheet,
wherein said light-collecting sheet converts light emitted in a slant direction from the emission surface of said light guiding plate in a plane parallel to the incidence surface of said light guiding plate into light to be emitted from a front surface of said light-collecting sheet in a direction substantially perpendicular to the emission surface of said light guiding plate.

* * * * *